United States Patent
Yaseri et al.

(10) Patent No.: US 12,492,622 B1
(45) Date of Patent: Dec. 9, 2025

(54) RECYCLING PRODUCED WATER FOR HYDROCARBON AND MINERAL CO-PRODUCTION

(71) Applicant: KING FAHD UNIVERSITY OF PETROLEUM AND MINERALS, Dhahran (SA)

(72) Inventors: Ahmed Zarzor Hussien Yaseri, Dhahran (SA); Mohammed Alyousef, Dhahran (SA); Mustafa Al-Ramadan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/015,936

(22) Filed: Jan. 10, 2025

(51) Int. Cl.
*E21B 43/16* (2006.01)
*C02F 1/66* (2023.01)
(Continued)

(52) U.S. Cl.
CPC .............. *E21B 43/164* (2013.01); *C02F 1/66* (2013.01); *C02F 5/02* (2013.01); *C02F 2103/10* (2013.01)

(58) Field of Classification Search
CPC ................................ E21B 43/164; C09K 8/34
(Continued)

(56) References Cited

U.S. PATENT DOCUMENTS

| 4,441,555 | A | 4/1984 | Shu |
| 5,056,596 | A | 10/1991 | McKay et al. |

(Continued)

FOREIGN PATENT DOCUMENTS

| WO | WO 2021/183437 A1 | 9/2021 |
| WO | WO 2021/225448 A1 | 11/2021 |

OTHER PUBLICATIONS

Ning Liu, et al., "Biomimetic sequestration of CO2 in carbonate form: Role of produced waters and other brines", Fusl Processing Technology, vol. 66, Issues 14-15, Oct. 2005 (5 pages).

(Continued)

*Primary Examiner* — William D Hutton, Jr.
*Assistant Examiner* — Ashish K Varma
(74) *Attorney, Agent, or Firm* — Oblon, McClelland, Maier & Neustadt, L.L.P.

(57) ABSTRACT

A method of co-generating hydrocarbon and mineral products by recycling an aqueous byproduct is described. The method includes (a) obtaining produced water from a subterranean reservoir via a production well, in fluid communication with a first side of the subterranean reservoir; (b) treating the produced water with carbon dioxide ($CO_2$) to obtain carbonated water; (c) treating the carbonated water with a base including hydroxide ions to obtain processed water; (d) injecting the processed water into the subterranean reservoir via an injection well that is in fluid communication with a second side of the subterranean reservoir, the processed water displacing fluids naturally present in the subterranean reservoir, the fluids including crude oil and formation water; (e) collecting the fluids via the production well; (f) separating the crude oil from the formation water; and (g) repeating (b), (c), (d), (e) and (f) using the formation water as the produced water.

20 Claims, 15 Drawing Sheets

(51) Int. Cl.
  *C02F 5/02*    (2023.01)
  *C02F 103/10*  (2006.01)

(58) Field of Classification Search
  USPC .................................................. 166/305.1
  See application file for complete search history.

(56) References Cited

U.S. PATENT DOCUMENTS

| | | | |
|---|---|---|---|
| 8,137,527 B1 * | 3/2012 | Woods ................ | B01D 53/965 |
| | | | 205/555 |
| 8,882,967 B1 * | 11/2014 | Patel ................. | B01D 19/0031 |
| | | | 96/155 |
| 9,688,900 B2 * | 6/2017 | Beuterbaugh ......... | C09K 8/703 |
| 9,808,757 B2 * | 11/2017 | Patel .................... | B01D 53/62 |
| 2011/0030957 A1 * | 2/2011 | Constantz ............. | B01D 53/62 |
| | | | 166/305.1 |
| 2024/0240538 A1 | 7/2024 | Okuno et al. | |

OTHER PUBLICATIONS

Yeonkyeong Lee, et al., "Relationship between oil production and CO2 storage during low-salinity carbonate water injection in acid carbonate reservoirs", Journal of Industrial and Engineering Chemistry, vol. 88. Aug. 26, 2020 (5 pages).

\* cited by examiner

C Kα1_2

Mg Kα1_2

RECYCLING PRODUCED WATER FOR HYDROCARBON AND MINERAL CO-PRODUCTION

BACKGROUND

Technical Field

The present disclosure is directed to a method of co-generating hydrocarbon and mineral products by recycling an aqueous byproduct.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Addressing climate change requires innovative and effective approaches to reduce atmospheric carbon dioxide ($CO_2$) level, which contributes significantly to global warming. The $CO_2$ sequestration in geological formations has been proposed as a promising method to reduce atmospheric $CO_2$ levels. However, the cost of $CO_2$ capture (46 USD/t$CO_2$, excluding $CO_2$ transport) and storage (up to 20 USD/t$CO_2$) remains critical (Rubin, E. S., Davison, J. E., & Herzog, H. J. (2015). *The cost of $CO_2$ capture and storage. International Journal of Greenhouse gas control*, 40, 378-400).

US20110030957A1 discloses sequestering $CO_2$ by contacting it with an aqueous mixture such as a subterranean brine. Protons can be removed by an agent such as sodium hydroxide.

US20240240539A1 discloses injecting an aqueous solution (e.g., produced water) containing a carboxylate into a subterranean reservoir. The aqueous solution may also contain a surfactant and/or a base (e.g., sodium hydroxide (NaOH)). A fluid can be produced from the subterranean reservoir from one or more wells.

WO2021183437A1 discloses absorbing or adsorbing $CO_2$ into water (e.g., produced water) to form a $CO_2$ solution gas mixture stream and injecting the $CO_2$ solution gas mixture stream into a wellbore into a gas sequestration medium. The water may contain a base such as NaOH. When the base is included, at least a portion of the $CO_2$ gas is converted to an $HCO_3^-$ ion. The pH is controlled to avoid significant production of insoluble carbonate ion, such as, for example, below 9.

U.S. Pat. No. 5,056,596A discloses a method of producing heavy crude oil or tar sand oil or bitumen from an underground formation. An aqueous fluid communication path is established within and through the formation between an injection well and a production well. An aqueous stream is introduced into the formation via the injection well at about 130° C., with heavy crude oil or tar sand oil or bitumen. The aqueous stream contains hot water, NaOH and carbon dioxide.

U.S. Pat. No. 4,441,555A discloses a method for the recovery of viscous oil from a subterranean, viscous oil-containing formation, including (a) injecting into the formation via an injection well a carbonated fluid including water and a base (e.g., NaOH) that acts as a $CO_2$ solubility promoter; (b) injecting into the formation via the injection well a heated fluid to release $CO_2$ from the carbonated fluid; and (c) recovering fluids including oil from the formation via a production well.

WO2021225448A1 discloses mixing a pressurized $CO_2$ stream with an injection water stream (e.g., produced water) to form a carbonated water stream; and injecting the carbonated water stream into a reservoir. Injecting the carbonated stream into a hydrocarbon reservoir may advantageously support reservoir pressure and stimulate hydrocarbon production, i.e. to support formation pressure.

Liu et al. [Liu, N., Bond, G. M., Abel, A., McPherson, B. J., & Stringer, J. (2005). *Biomimetic sequestration of $CO_2$ in carbonate form: Role of produced waters and other brines. Fuel processing technology*, 86(14-15), 1615-1625.] studied the development of a system resembling a $CO_2$ scrubber, in which carbonic anhydrase catalyzes the rate of $CO_2$ hydration for subsequent fixation into stable mineral carbonates. Produced water is used as a counterion for precipitation.

Lee et al. [Lee, Y., Kim, S., Wang, J., & Sung, W. (2020). *Relationship between oil production and $CO_2$ storage during low-salinity carbonate water injection in acid carbonate reservoirs. Journal of Industrial and Engineering Chemistry*, 88, 215-223.] studied oil recovery and $CO_2$ storage efficiencies during low-salinity carbonate waterflooding in carbonate reservoirs containing "acid" formation water. The $CO_2$ dissolved in injected carbonate water yielded calcium carbonate ($CaCO_3$) precipitation in acidic reservoirs.

Accordingly, one objective of the present disclosure is to explore an effective and low-cost method to reduce $CO_2$ level in atmosphere. This method may circumvent the aforementioned stated drawbacks by using produced water for reducing the carbon footprint through $CO_2$ utilization.

SUMMARY

In an exemplary embodiment, a method of co-generating hydrocarbon and mineral products by recycling an aqueous byproduct is described. The method includes (a) obtaining produced water from a subterranean reservoir via a production well that is in fluid communication with a first side of the subterranean reservoir; (b) treating the produced water with carbon dioxide to obtain carbonated water including 30-50 grams per liter (g/L) of carbon dioxide; (c) treating the carbonated water with a base including hydroxide ions to obtain processed water and a precipitate therein, wherein the precipitate includes mineral salts, and the processed water includes a portion of the hydroxide ions and has a pH of at least 10 so that the processed water does not include carbonate ($CO_3^{2-}$) ions or hydrogencarbonate ($HCO_3^-$) ions; (d) injecting the processed water into the subterranean reservoir via an injection well that is in fluid communication with a second side of the subterranean reservoir, the processed water displacing fluids naturally present in the subterranean reservoir, the fluids including crude oil and formation water; (e) collecting the fluids via the production well; (f) separating the crude oil from the formation water; and (g) repeating (b), (c), (d), (e) and (f) using the formation water as the produced water.

In some embodiments, the method further includes filtering the processed water, between (c) and (d), to separately collect the precipitate and the processed water.

In some embodiments, the precipitate includes calcium carbonate ($CaCO_3$), magnesium carbonate ($MgCO_3$) and magnesium hydroxide ($Mg(OH)_2$).

In some embodiments, the method includes filtering the carbonated water, between (a) and (b), to remove a suspended solid.

In some embodiments, the method includes desalting the crude oil, between (f) and (g), by adding water to form a mixture, heating the mixture, removing salty water from the mixture, and adding the salty water to the formation water.

In some embodiments, separating the crude oil from the formation water, in (f), includes at least one selected from the group consisting of decantation, centrifugation, gas flotation, filtration and capacitance-based separation.

In some embodiments, the processed water leads to a volumetric oil recovery increase of about 40% relative to the produced water and about 14% relative to the carbonated water.

In some embodiments, a surface tension between the processed water and the crude oil is at least 30% smaller than a surface tension between the carbonated water and the crude oil.

In some embodiments, the processed water reduces a water contact angle of rocks in the subterranean reservoir from 150-170 degrees (°) to 25-45°.

In some embodiments, the method includes a closed aqueous loop in which no water other than the fluids naturally present in the subterranean reservoir is used.

In some embodiments, the processed water is injected into the subterranean reservoir so that the portion of the hydroxide ions in the processed water reacts with an organic acid naturally present in the subterranean reservoir to form a surfactant.

In some embodiments, in (b), the treating the produced water with carbon dioxide includes introducing the carbon dioxide at a pressure of 600-1,000 pounds per square inch (psi).

In some embodiments, in (d), the processed water is injected into the subterranean reservoir at a temperature of 20-30 degrees Celsius (° C.).

In some embodiments, the produced water includes 10,000-60,000 parts per million (ppm) of $Na^+$, 800-5,000 ppm of $Mg^{2+}$, and 3,000-8,000 ppm of $Ca^{2+}$, based on a total weight of the produced water.

In some embodiments, the processed water includes 10,000-60,000 ppm of $Na^+$, 200-600 ppm of $Mg^{2+}$, and 2,000-3,000 ppm of $Ca^{2+}$, based on a total weight of the processed water.

In some embodiments, the produced water includes, about 18,991 ppm of $Na^+$, about 1,016 ppm of $Mg^{2+}$, and about 3,822 ppm of $Ca^{2+}$, the processed water includes, based on the total weight of the processed water, about 20,314 ppm of $Na^+$, about 403 ppm of $Mg^{2+}$, and about 2,831 ppm of $Ca^{2+}$, and the carbonated water includes about 41.41 g/L of carbon dioxide, based on the total weight of the produced water.

In some embodiments, the produced water has a pH of 5 to 7, the carbonated water has a pH of 3 to 6, and the processed water has a pH of 10 to 14.

In some embodiments, the produced water has a pH of about 6.84, the carbonated water has a pH of about 5.28, and the processed water has a pH of about 10.15.

In some embodiments, the base includes at least one strong base selected from the group consisting of sodium hydroxide, potassium hydroxide and lithium hydroxide.

In some embodiments, the crude oil includes 20-30 weight percent (wt. %) of saturated alkanes, 40-60 wt. % of aromatics, 20-30 wt. % of resins, and 1-10 wt. % of asphaltenes, based on a total weight of the crude oil.

In some embodiments, the crude oil includes, about 22.76 wt. % of saturated alkanes, about 50.04 wt. % of aromatics, about 24.16 wt. % of resins, and about 3.04 wt. % of asphaltenes, based on a total weight of the crude oil.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings.

DETAILED DESCRIPTION

Figure 1:
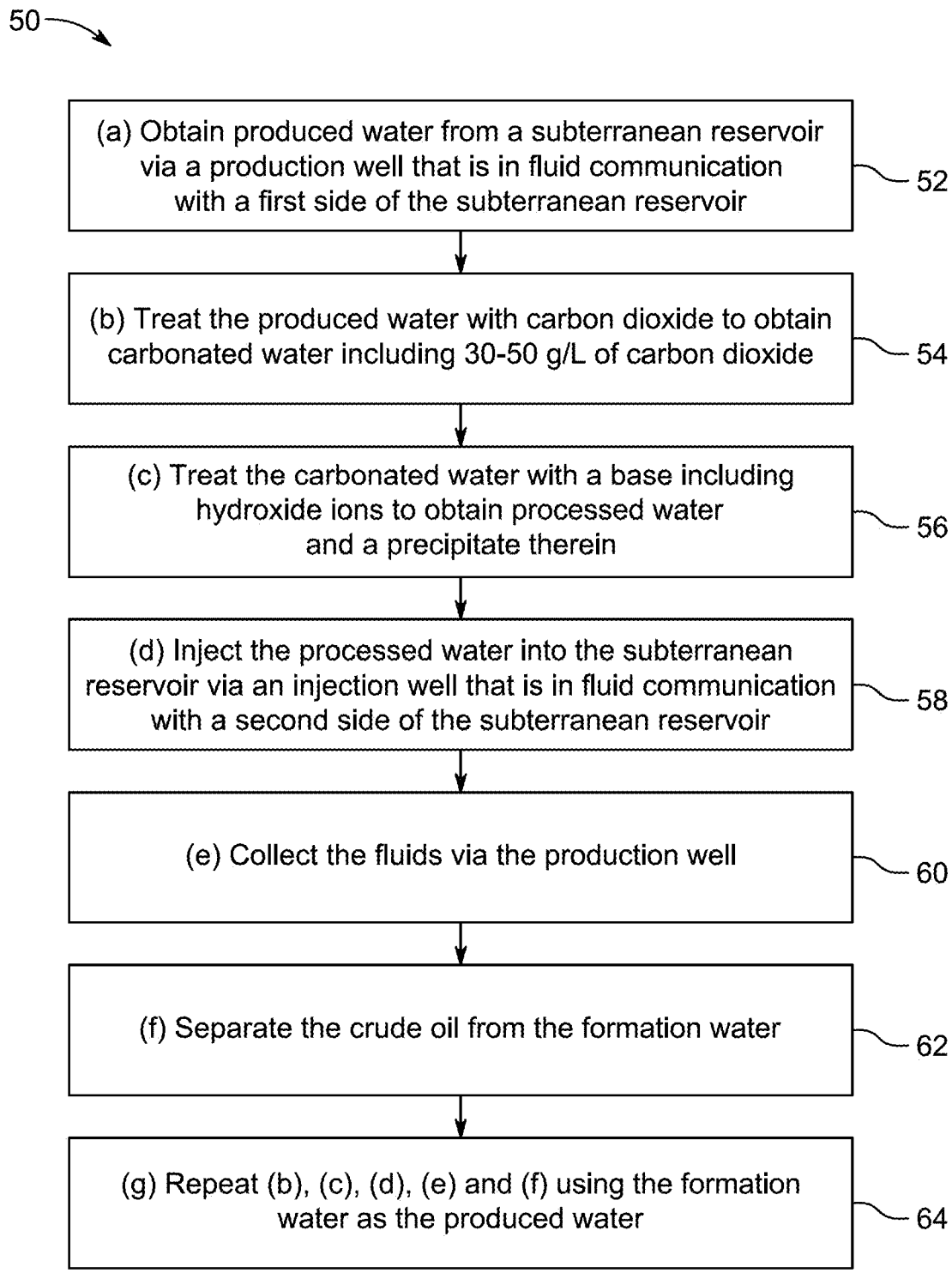
FIG. 1 is a method flow chart for co-generating hydrocarbon and mineral products by recycling an aqueous byproduct, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'compound' refers to a chemical entity, regardless of its phase-solid, liquid, or gaseous-as well as its state-crude mixture, purified, or isolated.

As used herein, the term 'particle(s)' refers to a small object that acts as a whole unit with regard to its transport and properties.

As used herein, the term 'room temperature' refers to a temperature range of '25 degrees Celsius (° C.)±3° C. in the present disclosure.

As used herein, the term 'ultrasonication' or 'sonication' refers to the process in which sound waves are used to agitate particles in a solution.

As used herein, the term 'calcination' refers to heating a compound to a high temperature, under a restricted supply of ambient oxygen. This is performed to remove impurities or volatile substances and to incur thermal decomposition.

As used herein, 'crystallites' refer to tiny (generally microscopic) crystals that are bonded together by boundaries that are substantially irregular, including polycrystalline solids.

As used herein, 'porosity' refers to a measure of the void spaces in a material, typically expressed as a percentage of the total volume.

As used herein, 'pore volume' refers to the volume of fluid that has been injected into a reservoir relative to the total pore volume of the reservoir. It is a critical factor in understanding water retention, movement, and availability in various environmental and geological contexts.

As used herein, 'water contact angle' refers to a measure of the wettability of a solid surface. Hydrophobic solids have a contact angle above 900 (indicative of poor wetting), and hydrophilic solids have a contact angle below 90° (indicative of water-loving). The contact angle is often used for gauging the extent of cleanliness of a surface.

As used herein, 'wettability' refers to the preference of a liquid to be in contact with a solid surrounded by another fluid (liquid or gas). It is controlled by the balance between the intermolecular interactions of adhesive type (liquid to surface) and cohesive type (liquid to liquid).

As used herein, 'surface wettability' refers to the ability of a liquid to spread over a solid surface and is characterized by the contact angle. The surfaces with low contact angles are considered hydrophilic (wettable), while those with high contact angles are hydrophobic (non-wettable).

As used herein, 'interfacial tension (IFT)' refers to the energy required to increase the surface area of a boundary between two immiscible phases, mostly two liquids. However, at a gas-liquid interface, it is also called surface tension, and at a gas-solid interface, it is also called surface free energy.

As used herein, 'capillary forces' refer to the intermolecular forces that allow a liquid to move through narrow spaces or pores because of the interactions between the liquid and a solid surface, affected by cohesion and adhesion.

As used herein, 'zeta potential' refers to a measure of the electrical charge developed when a solid surface is brought into contact with an aqueous solution.

As used herein, 'filtration' refers to a mechanical or physical operation that can be employed for the separation of constituents of homogeneous or heterogeneous solutions. Types of filtration can be categorized by the estimated sizes of chemicals to be separated and can involve particle filtration (>10 μm); microfiltration (0.1-10 μm); ultrafiltration (0.01-0.1 μm); nanofiltration (NF) (0.001-0.01 μm); and reverse osmosis, or RO (<0.001 μm).

As used herein, 'micromodel flooding' refers to a laboratory technique that uses scaled-down models to simulate and study fluid flow and displacement in porous media.

As used herein, 'micro-displacement efficiency' refers to the effectiveness of a system or mechanism in displacing small volumes of fluid or material with nominal energy loss. It is a measure of how well the displacing fluid mobilizes the residual oil once the fluid has come in contact with the oil.

As used herein, 'subterranean reservoir' refers to a geological structure or cavity that can store water, natural gas, or other substances.

As used herein, 'production well' refers to a drilled well designed to extract oil, gas, brine, or other fluids from underground reservoirs.

As used herein, 'mineralization' refers to a process by which organic compounds are broken down into their mineral components, like carbon dioxide ($CO_2$) and water ($H_2O$).

As used herein, 'ion concentration' refers to the concentration of ions in a solution or in the atmosphere.

As used herein, 'total inorganic carbon (TIC)' refers to the concentration of inorganic carbon species in a solution, primarily including $CO_2$, bicarbonate ($HCO_3^-$), and carbonate ($CO_3^{2-}$) which impact pH, alkalinity, and carbon cycling in aquatic environments.

As used herein, 'surface charge' refers to the net electrical charge on the surface of a material that affects its interaction in surrounding environments.

As used herein, 'isoelectric point (IEP)' refers to the pH at which a molecule carries no net electrical charge or is electrically neutral in the statistical mean.

As used herein, 'produced water' refers to a complex mixture of organic and inorganic chemicals that is a byproduct of oil and gas extraction. It contains several contaminants and needs vigilant management to abate environmental impact.

As used herein, 'formation water' refers to the water that's naturally present in underground rock formations and oil reservoirs contains dissolved minerals and salts. It is also known as 'produced water' after it is extracted by oil and gas production processes.

As used herein, 'carbonated water' refers to the water containing dissolved $CO_2$ gas, either artificially injected under pressure or formed through natural geological processes.

As used herein, 'processed water' refers to a water that has been treated to remove contaminants and minerals so it can be used in various industrial processes.

As used herein, 'smart water' refers to a chemically enhanced water containing specific additives, for instance, minerals or nutrients, formulated to improve its properties for diverse applications including agricultural, industrial, or health-related. The terms 'processed water' and 'smart water' are used interchangeably in the present disclosure.

As used herein the term 'deionized water' refers to the water that has (most or all of) the ions removed.

As used herein the term 'surfactant' refers to a compound that contains a lipophilic segment and a hydrophilic segment, which when added to water or solvents, reduces the surface tension of the system.

As used herein, 'crude oil' refers to a complex mixture of hydrocarbons, which are chemicals made up of hydrogen and carbon, and other organic and inorganic substances.

As used herein, 'enhanced oil recovery (EOR)' refers to a process for extracting oil that has not already been retrieved through the primary or secondary oil recovery techniques.

As used herein, 'inductively coupled plasma (ICP) analysis' refers to an analytical technique employed for the detection and quantification of trace elements in samples by ionizing them in a high-temperature plasma and subsequently measuring the emitted light or mass of the ions.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed to a method of co-generating hydrocarbon and mineral products by recycling an aqueous byproduct. The method uses $CO_2$ to improve the quality of water produced from hydrocarbon reservoirs via $CO_2$-carbonate mineralization for treating produced water for EOR. This method aims to facilitate reinjection into reservoirs in order to increase oil recovery. Furthermore, the study aims to produce valuable minerals throughout the mineralization process to cover the costs of $CO_2$ capture.

FIG. 1 illustrates a flow chart of a method 50 for co-generating hydrocarbon and mineral products by recycling an aqueous byproduct. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes (a) obtaining produced water from a subterranean reservoir via a production well that is in fluid communication with a first side of the subterranean reservoir. This production well enables the flow of fluids, which can include a mixture of formation water and other fluids, as it is brought to the surface. The process typically relies on natural pressure gradients or artificial lift mechanisms to aid the movement of fluids from the reservoir to the surface, where the fluids can be collected for treatment or disposal. Proper placement and functioning of the production well are preferred for improving recovery and diminishing environmental impacts.

In some embodiments, the produced water includes 10,000-60,000 parts per million (ppm) of $Na^+$, preferably 20,000-50,000 ppm of $Na^+$, preferably 30,000-40,000 ppm of $Na^+$; 800-5,000 ppm of $Mg^{2+}$, preferably 1,000-4,000 ppm of $Mg^{2+}$, and preferably 2,000-3,000 ppm of $Mg^{2+}$; 3,000-8,000 ppm of $Ca^{2+}$, preferably 4,000-7,000 ppm of $Ca^{2+}$, and preferably 5,000-6,000 ppm of $Ca^{2+}$, based on a total weight of the produced water. In a preferred embodiment, the produced water includes 18,991 ppm of $Na^+$, 1,016 ppm of $Mg^{2+}$, and 3,822 ppm of $Ca^{2+}$, based on the total weight of the produced water.

At step 54, the method 50 includes (b) treating the produced water with $CO_2$ to obtain carbonated water including 30-50 gram per liter (g/L) of $CO_2$, preferably 31-49 g/L, preferably 32-48 g/L, preferably 33-47 g/L, preferably 36-46 g/L, preferably 37-45 g/L, preferably 38-44 g/L, preferably 39-43 g/L, and preferably 40-42 g/L of $CO_2$. In a preferred embodiment, the produced water is treated with $CO_2$ to obtain carbonated water including 41.41 g/L of $CO_2$. In some embodiments, $CO_2$ is introduced in the produced water at a pressure of 600-1,000 pound per square inch (psi), preferably 700-900 psi, and more preferably 800 psi. In a preferred embodiment, $CO_2$ is introduced in the produced water at a pressure of 800 psi.

In some embodiments, the method 50 includes filtering the carbonated water to remove a suspended solid between (a) and (b). Filtration may be done using a filter paper, by centrifugation, gravity filtration, vacuum filtration, pressure filtration, membrane filtration, decantation, gas flotation, capacitance-based separation, and microfiltration. In a preferred embodiment, the carbonated water is filtered using a filter paper (2.5-micron filter) to remove the suspended solids.

At step 56, the method 50 includes (c) treating the carbonated water with a base including hydroxide ions to obtain processed water and a precipitate. In some embodiments, the base includes at least one strong base selected from the group consisting of potassium hydroxide (KOH), sodium hydroxide (NaOH), lithium hydroxide (LiOH), rubidium hydroxide (RbOH), cesium hydroxide (CsOH), beryllium hydroxide ($Be(OH)_2$), magnesium hydroxide ($Mg(OH)_2$), strontium hydroxide ($Sr(OH)_2$), and calcium hydroxide ($Ca(OH)_2$). In a preferred embodiment, the base is NaOH. In some embodiments, the precipitate includes mineral salts, and the processed water includes a portion of the hydroxide ions and has a pH of at least 10, preferably 10-14, preferably 10.5-13, preferably 11-12.5, and preferably 11.5-12, so that the processed water does not include $CO_3^{2-}$ or $HCO_3^-$ ions. For instance, the processed water can have a pH of 10.15.

In some embodiments, the produced water has a pH of 5-7, preferably 5.2-6.8, preferably 5.5-6.5; the carbonated water has a pH of 3-6, preferably 3.5-5.5, and preferably 4-5, the processed water has a pH of 10-14, preferably 11-13, and preferably 12. In a preferred embodiment, the produced water has a pH of 6.84, the carbonated water has a pH of 5.28, the processed water has a pH of 10.15.

At step 58, the method 50 includes (d) injecting the processed water into the subterranean reservoir via an injection well that is in fluid communication with a second side of the subterranean reservoir. The processed water displaces fluids naturally present in the subterranean reservoir. The fluids can include crude oil and formation water. This procedure improves oil recovery by boosting reservoir pressure and allowing hydrocarbons to flow more easily to the production well, while also effectively managing generated water. In some embodiments, the processed water is injected into the subterranean reservoir so that the portion of the hydroxide ions in the processed water reacts with an organic acid naturally present in the subterranean reservoir to form a surfactant. The surfactant reduces IFT between oil and water, increasing crude oil mobilization and recovery efficiency by allowing the oil to flow more easily to production wells.

In some embodiments, the processed water is injected into the subterranean reservoir at a temperature of 15-70° C., preferably 17-50° C., preferably 20-30° C., preferably 21-29° C., preferably 22-28° C., preferably 23-27° C., and preferably 24-26° C. In a preferred embodiment, the processed water is injected into the subterranean reservoir at a temperature of 25° C.

In some embodiments, the processed water reduces a water contact angle of rocks in the subterranean reservoir from 150°-170° (preferably 151°-169°, preferably 152°-168°, preferably 153°-167°, preferably 154°-166°, preferably 155°-165°, preferably 156°-164°, preferably 157°-163°, preferably 158°-162°, and preferably 159°-161°) to 25°-45° (preferably 26°-44°, preferably 27°-43°, preferably 28°-42°, preferably 29°-41°, preferably 30°-40°, preferably 31°-39°, preferably 32°-38°, preferably 33°-37°, and preferably 34°-36°). In a preferred embodiment, the processed water reduces the water contact angle of rocks in the subterranean reservoir from 1610 to 35°. This happens at least partially due to the zeta potential shift from a positive to a negative mean value which alters the electrostatic interactions at the oil-water interface. When the zeta potential becomes negative, it lessens the repulsive forces between droplets and improves surfactant efficacy in mobilizing oil.

In some embodiments, the method includes filtering the processed water to separately collect the precipitate and the processed water between (c) and (d). In some embodiments, the precipitate includes calcium carbonate ($CaCO_3$), magnesium carbonate ($MgCO_3$), and $Mg(OH)_2$. In some embodiments, the processed water includes 10,000-60,000 ppm of $Na^+$, preferably 20,000-50,000 ppm of $Na^+$, preferably 30,000-40,000 ppm of $Na^+$; 200-600 ppm of $Mg^{2+}$, preferably 250-550 ppm of $Mg^{2+}$, preferably 300-500 ppm of $Mg^{2+}$, and preferably 350-450 ppm of $Mg^{2+}$; and 2,000-3,000 ppm of $Ca^{2+}$, preferably 2,250-2,750 ppm of $Ca^{2+}$, and preferably 2,400-2,600 ppm of $Ca^{2+}$, based on a total weight of the processed water. In a preferred embodiment, the produced water includes 20,314 ppm of $Na^+$, 403 ppm of $Mg^{2+}$, and 2,831 ppm of $Ca^{2+}$, based on the total weight of the processed water.

At step 60, the method 50 includes (e) collecting the fluids via the production well. Suitable techniques to collect the fluids include, but are not limited to, natural flow, mechanical pumps, gas lift, foam injection, and hydraulic fracturing.

At step 62, the method 50 includes (f) separating the crude oil from the formation water. In some embodiments, the crude oil is separated from the formation water using a technique including, but not limited to, decantation, centrifugation, gas flotation, filtration and capacitance-based separation. In some embodiments, the crude oil includes 20-30 weight percent (wt. %) of saturated alkanes, preferably 21-29 wt. %, preferably 22-28 wt. %, preferably 23-27 wt. %, and preferably 24-26 wt. % of saturated alkanes; 40-60 wt. % of aromatics, preferably 41-59 wt. %, preferably 42-58 wt. %, preferably 43-57 wt. %, preferably 44-56 wt. %, preferably 45-55 wt. %, preferably 46-54 wt. %, preferably 47-53 wt. %, preferably 48-52 wt. %, preferably 49-51 wt. % of aromatics; 20-30 wt. % of resins, preferably 21-29 wt. %, preferably 22-28 wt. %, preferably 23-27 wt. %, and preferably 24-26 wt. % of resins; and 1-10 wt. % of asphaltenes, preferably 2-9 wt. %, preferably 3-8 wt. %, preferably 4-7 wt. %, and preferably 5-6 wt. % of asphaltenes, based on a total weight of the crude oil. In a preferred embodiment, the crude oil includes about 22.76 wt. % of saturated alkanes, about 50.04 wt. % of aromatics, about 24.16 wt. % of resins, and about 3.04 wt. % of asphaltenes, based on the total weight of the crude oil.

In some embodiments, the processed water leads to a volumetric oil recovery increase of about 40% relative to the produced water and about 14% relative to the carbonated water. In some embodiments, a surface tension between the processed water and the crude oil is at least 30%, preferably 35-80%, and preferably 40-60%, smaller than a surface tension between the carbonated water and the crude oil.

At step 64, the method 50 includes (g) repeating steps (b), (c), (d), (e) and (f) using the formation water as the produced water. In some embodiments, between steps (f) and (g), the method includes desalting the crude oil by adding water to form a mixture, heating the mixture, removing salty water from the mixture, and adding the salty water to the formation water. Adding water to the oil to creates an emulsion, eventually facilitating separation of dissolved salts and impurities. The reaction mixture may be heated using heating appliances such as hot plates, heating mantles, hot air ovens, microwaves, autoclaves, tapes, oil baths, salt baths, sand baths, air baths, hot-tube furnaces, and hot-air guns.

The salty water may be removed from the mixture using a separation technique such as centrifugation, gravity filtration, vacuum filtration, pressure filtration, membrane filtration, decantation, gas flotation, capacitance-based separation, or microfiltration. Heating assists in improving separation efficiency by reducing viscosity. Then, the salty water is added to the formation water which involves using the salty water as at least part of the produced water and reinjecting the salty water back into subsurface reservoirs. This procedure can help to maintain reservoir pressure, boost oil recovery, and manage produced water waste. To avoid scaling or contamination, the reinjected water needs to be compatible with the formation water. This approach is frequently included into EOR procedures and is closely monitored to reduce environmental impacts and preserve the long-term viability of both water resources and oil extraction activities.

In some embodiments, the method 50 includes a closed aqueous loop. That is, no external or additional water is added. For instance, the fluids (e.g. the formation water) present in the subterranean reservoir is used to make (e.g. being the source of) the produced water, which is used to make the carbonated water which is used to make the smart water (also referred to as the processed water). The base such as NaOH is added in a solid form without first being dissolved in water. The carbon dioxide is used in a gas form without being mixed with water. The crude oil is separated from the formation water without adding external or additional water to the formation water. As a result, all water used in the method 50 comes from the fluids naturally present in the subterranean reservoir, and no external or additional water is needed. Alternatively, the method 50 includes an open aqueous loop. That is, some external or additional water may be used in the method 50, for example to dissolve the base so that the base is used in a solution form to treat the carbonated water.

Examples

The following examples demonstrate a method for co-generating hydrocarbon and mineral products by recycling an aqueous byproduct. The examples are provided solely for illustration and are not to be construed as limitations of the present disclosure, as many variations thereof are possible without departing from the spirit and scope of the present disclosure.

Example 1: Materials and methods

This study examined three types of water: produced, carbonated, and smart water (or processed water). Produced water, the base fluid, was used to create the other two. Salts listed in Table 1 (sodium chloride (NaCl), magnesium chloride hexahydrate ($MgCl_2 \cdot 6H_2O$), calcium chloride dihydrate ($CaCl_2 \cdot 2H_2O$), sodium sulfate ($Na_2SO_4$)) were added in the mentioned concentrations (in parts per million (ppm)) to deionized water to prepare the produced water and mixed overnight at 500 revolutions per minute (rpm). Table 1 shows the theoretical concentrations of salts added to prepare the synthetic-produced water, representing the total amount of salts intended for dissolution. The resulting water was filtered using filter paper to remove suspended or undissolved solids.

TABLE 1

Synthetic-produced water salt composition

| Salt | Concentration (ppm) |
| --- | --- |
| NaCl | 53,670 |
| $MgCl_2 \cdot 6H_2O$ | 8510 |
| $CaCl_2 \cdot 2H_2O$ | 18,810 |
| $Na_2SO_4$ | 1351 |
| Total dissolved salts (TDS) | 82,341 |

The crude oil used, which was taken from the Uthmaniyah field in Saudi Arabia, had an API 32, a density of 0.857 gram per cubic centimeter ($g/cm^3$), and a viscosity of 7.5 centipoise (cP), respectively. The oil has a total acid number (TAN) of 0.07 milligrams (mg) KOH/gram. The saturates, aromatics, resins, and asphaltenes (SARA) fractions in weight percent (wt. %) are shown in Table 2.

TABLE 2

Crude oil SARA analysis

| SARA | Content (wt. %) |
| --- | --- |
| Saturates | 22.76 |
| Aromatics | 50.04 |

TABLE 2-continued

Crude oil SARA analysis

| SARA | Content (wt. %) |
| --- | --- |
| Resins | 24.16 |
| Asphaltenes | 3.04 |

The carbonated water was prepared by mixing 200 mL of produced water using a high-pressure, high-temperature (HPHT) mixing reactor operating at 300 rpm and 25 degrees Celsius (° C.) to accelerate equilibrium. Further, $CO_2$ was introduced until the pressure reached 800 pounds per square inch (psi), and mixing was continued until the pressure stabilized.

Figure 2:
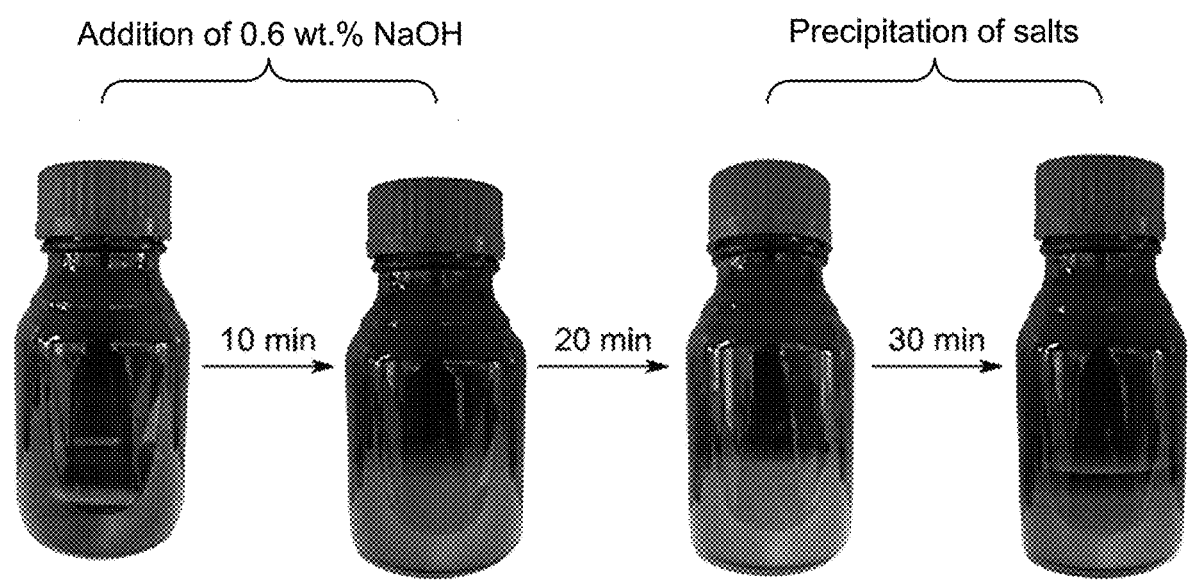
FIG. 2 shows time series images of precipitation materials after the addition of sodium hydroxide (NaOH) with time, according to certain embodiments.

After the solution was mixed, 200 mL of carbonated water with dissolved $CO_2$ was split into two 100 mL containers. One of these containers underwent a gradual addition of NaOH until the pH reached >10, indicating a NaOH concentration of 0.6 wt. %. The addition of NaOH was carefully regulated, and the pH was monitored using a pH meter inside the container. NaOH addition stopped once the pH surpassed 10. After adjusting the pH, the solution was allowed to react for 30 minutes (min). It is important to mention that NaOH was used to eliminate undesirable calcium ions from the water by causing them to precipitate. The evolution of the smart water at various time intervals is depicted in FIG. 2. Table 3 provides the pH values of each water sample after preparation.

TABLE 3 pH values of the water samples

| Sample | pH |
| --- | --- |
| Produced water | 6.84 |
| Carbonated water | 5.28 |
| Smart water | 10.15 |

Further characterization of the fluids was performed through additional testing. Total Inorganic Carbon (TIC) analysis quantified the inorganic carbon content in the precipitates, providing insights into the carbonate mineral content. Inductively coupled plasma (ICP) analysis was conducted to determine the concentration of ions in the water solution.

Example 2: Characterization of Precipitated Materials

After adding sodium hydroxide (NaOH) to the solution and the subsequent precipitation of carbonate (e.g., calcium carbonate ($CaCO_3$) and magnesium carbonate ($MgCO_3$)) due to the reaction of existing ions with $CO_2$, the resulting mixture was filtered using a 2.5-micron filter to isolate the precipitated carbonates. The precipitation was then dried in an oven at 50° C. for one day to ensure dryness. Subsequently, a series of tests were conducted to characterize the precipitates. X-ray Diffraction (XRD) was employed to identify the crystalline structure of the precipitation, providing insights into their mineral composition. Scanning electron microscopy with energy dispersive X-ray spectroscopy (SEM-EDS) was utilized to examine the surface morphology and perform elemental analysis, offering information on the chemical composition and structure of the precipitates.

Example 3: Interfacial Tension (IFT) Measurements

IFT measurements were conducted using a KRUSS Spinning Drop Tensiometer (SDT). This instrument creates a drop of one liquid immersed in another immiscible liquid to measure IFT. A syringe is filled with the desired liquid and then plugged, and a needle forms a drop at its tip, suspended in the second liquid. The needle can rotate, causing the drop to spin and stabilizing it for shape measurement. A high-resolution camera captures the spinning drop from different angles, and specialized software analyzes these images to determine the drop's shape and calculate the interfacial tension. This method provides a reliable way to measure interfacial tension, which is important for understanding fluid behavior at interfaces. Experiments were conducted at 25° C. and 70° C. with a rotational speed of 4000 rpm, using the Young-Laplace model for analysis.

Example 4: Contact Angle Measurements

The KRUSS drop shape analyzer (DSA) measures contact angles by analyzing the shape of a liquid drop on a solid surface. A small droplet of liquid is dispensed onto the surface, and a high-resolution camera captures images of the drop from different angles. Specialized software then analyzes these images to determine the contact angle, providing important information about the wetting behavior of the liquid on the solid surface. For the wettability measurement, three disc-shaped Berea sandstone rock samples were prepared. The samples were cleaned using the Soxhlet extraction method for a day, then were saturated directly in oil under vacuum, pressurized to 1200 psi, and aged for one week at 70° C. After aging, the samples were washed with toluene to remove any residues from the surface and soaked in fresh toluene for an hour, changing the toluene every 20 min until no change in color was observed. The initial contact angle was measured, and then the samples were aged with the desired liquids for the same duration and procedure. Afterward, the contact angle was measured.

Example 5: Zeta Potential Measurements

Zeta potential measurements were important for assessing solution stability using the LiteSizer Dynamic light scattering (DLS) 100 from Anton Paar. A specialized vial was filled with the liquid sample and placed in the analyzer, which then applied an electric field to move the particles in response to their surface charges, determining the absolute zeta potential value. This value provides insights into the electrostatic repulsions between particles, indicating solution stability (higher zeta potential values suggest better stability). Initially, zeta potential was measured for the liquids without oil. Subsequently, zeta potential was measured for the same liquids with added oil, using a ratio of 5 parts water to 1 part of oil. For each formulation, 8 mL was added to a glass cup, followed by 2 mL of oil. The mixture was then stirred at 3000 rpm and left for 20 min to ensure stable emulsion formation. After sonication, zeta potential was measured, and all the samples followed the exact procedure.

Example 6: Micromodel Flooding

A glass micromodel was employed to investigate recovery performance at the pore-scale level. Table 4 tabulates the properties of the glass micromodel used. The Micromodel features varying grain sizes and pore structures. The experimental setup includes a syringe pump, a high-speed microscope, and a glass chip placed on a base with a light source. Initially, the chip is saturated with formation water at a 1 microliter per hour (µL/h) flow rate and left overnight to ensure complete saturation and the absence of bubbles. Subsequently, oil is injected at the same rate and left overnight to achieve oil saturation, with the remaining water saturation representing irreducible water saturation. Following this, the desired fluid is injected at a rate of 4 µL/h, and the recovery process is analyzed using the image processing software ImageJ.

TABLE 4

Properties of the glass micromodel used

| Property | Value |
| --- | --- |
| Porosity (%) | 37.23 |
| Length (millimeter (mm)) | 4.415 |
| Width (mm) | 3.302 |
| Depth (mm) | 0.011 |
| Pore volume (µL) | 0.06 |

In order to better understand the fluid-fluid and fluid-rock interactions, the used water was analysed. Table 5 provides the actual ion concentrations measured using ICP, which reflect the final ion content in solution. ICP results showed that the calcium and magnesium contents were reduced by 991 ppm and 613 ppm, respectively, as a result of the mineralization/precipitation process after NaOH treatment (pH=10.15). Table 1 and Table 5 appear to disclose different ion concentrations for produced water because Table 1 reflects the composition based on salt addition, while Table 5 captures the equilibrium state after factors like partial dissolution and interactions within the solution are considered, resulting in different ion concentrations.

TABLE 5

Comparison of ions concentrations of used water by ICP

| | Element | | | | |
| --- | --- | --- | --- | --- | --- |
| | Na | Mg | Ca | Cl | $SO_4$ |
| | | | Unit | | |
| | ppm | ppm | ppm | ppm | ppm |
| Produced water | 18991 | 1016 | 3822 | 49849 | 871 |
| Carbonated water | 18300 | 1007 | 3844 | 48041 | 817 |
| Smart water | 20314 | 403 | 2831 | 47038 | 709 |

However, the ion concentrations were not affected for the carbonated water since the carbonates were still soluble in water due to the low pH (5.28). Therefore, carbonated water has the highest TIC content, while produced and smart water have zero (Table 6).

TABLE 6

Comparison of total inorganic carbon (TIC) content of used water

| Sample | TIC | Sample volume | Dilute |
| --- | --- | --- | --- |
| Smart water | 0 mg/L | 200 µL | 0.25 in 40.25 |
| Carbonated water | 204.2 mg/L ± 2.80 mg/L | 200 µL | 0.25 in 40.25 |
| Produced water | 0 mg/L | 200 µL | 0.25 in 40.25 |

Figure 3:
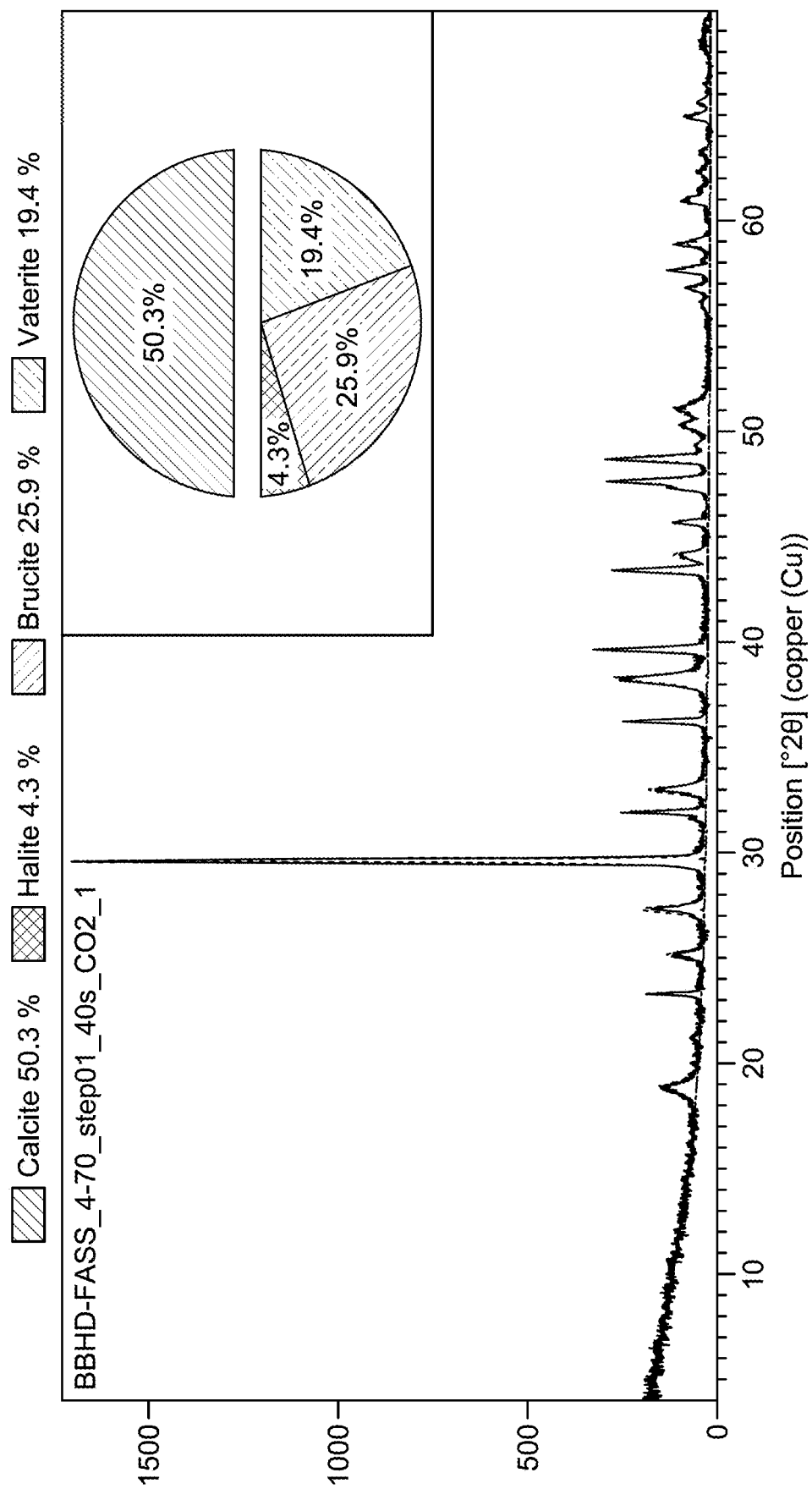
FIG. 3 shows an X-ray diffraction (XRD) pattern of the precipitation, according to certain embodiments.
Figure 4A:
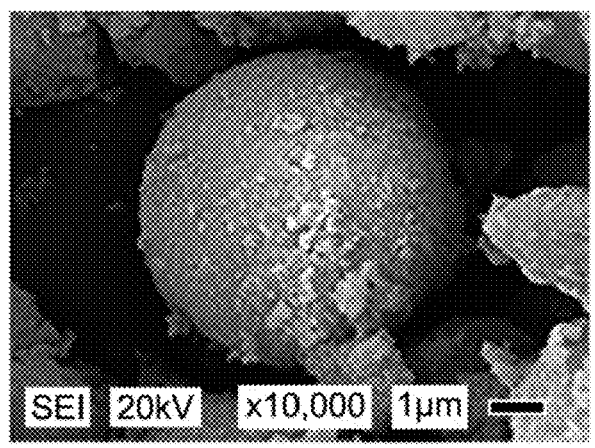
FIG. 4A shows a scanning electron microscopy (SEM) image of the precipitation at a magnification of 1 micrometer (μm), according to certain embodiments.
Figure 4B:
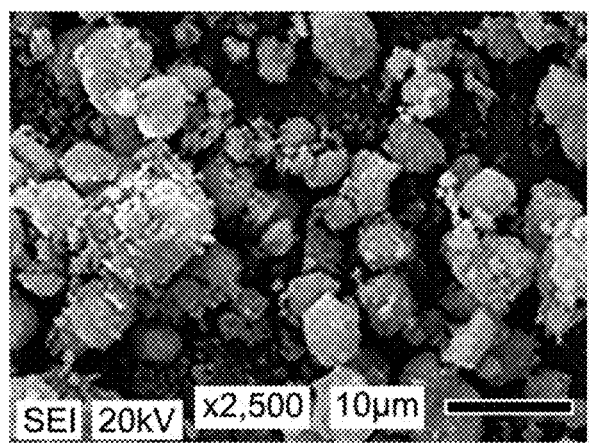
FIG. 4B shows an SEM image of the precipitation at a magnification of 10 μm, according to certain embodiments.
Figure 4C:
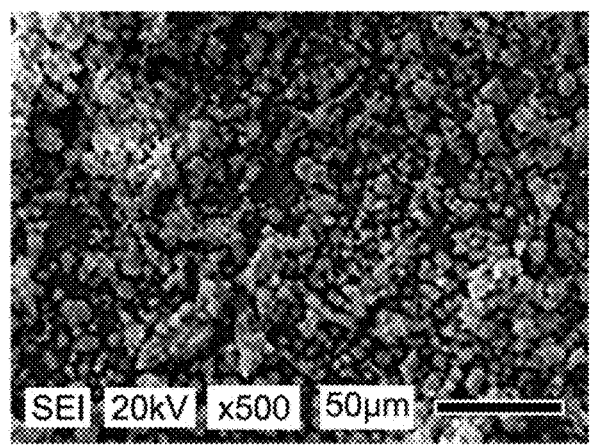
FIG. 4C shows an SEM image of the precipitation at a magnification of 50 μm, according to certain embodiments.
Figure 5A:
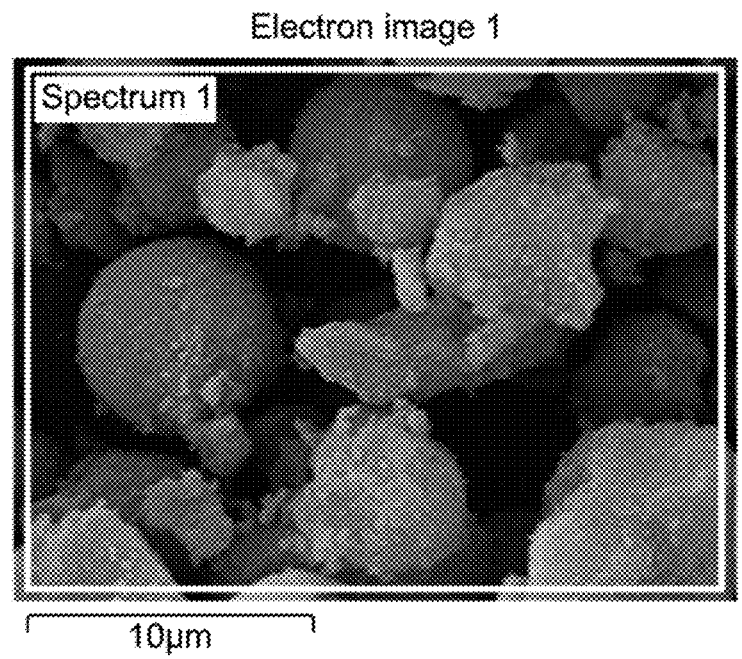
FIG. 5A shows an SEM micrograph of precipitated materials for analyzing an energy dispersive X-ray spectrum (EDS), according to certain embodiments.
Figure 5B:
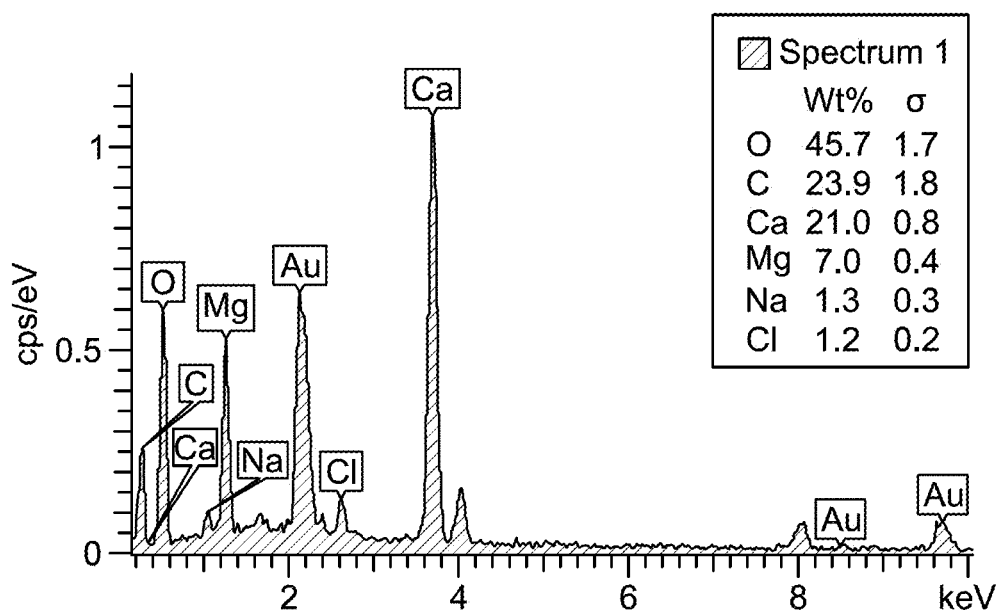
FIG. 5B shows an EDS spectrum of precipitated materials with an SEM micrograph for analyzing elemental composition, according to certain embodiments.
Figure 6A:
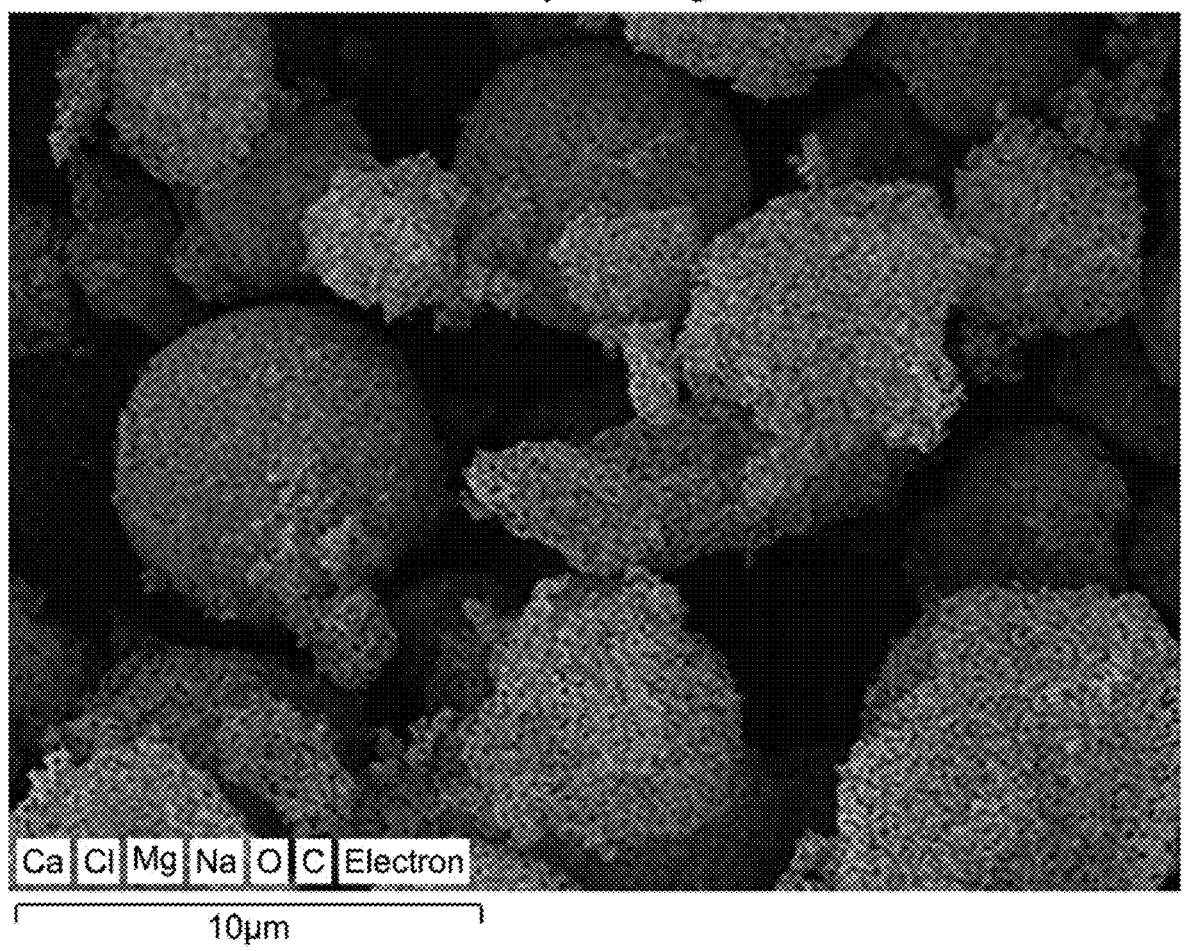
FIG. 6A shows an EDS-elemental map of the precipitate, according to certain embodiments.
Figure 6B:
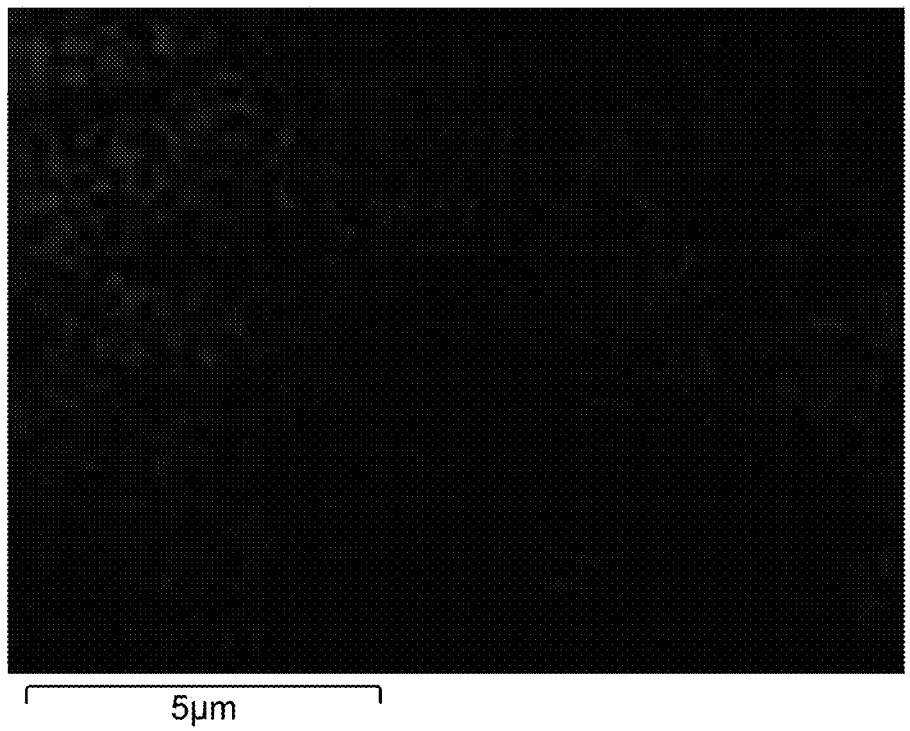
FIG. 6B shows an EDS-elemental mapping image of the precipitate showing the presence of carbon (C), according to certain embodiments.
Figure 6C:
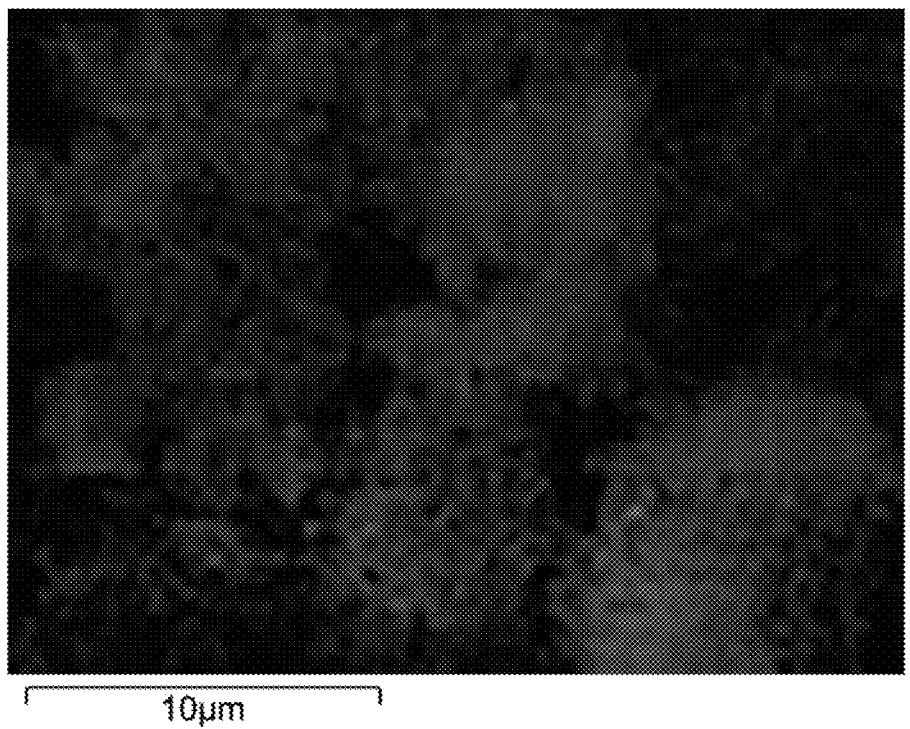
FIG. 6C shows an EDS-elemental mapping image of the precipitate showing the presence of magnesium (Mg), according to certain embodiments.
Figure 6D:
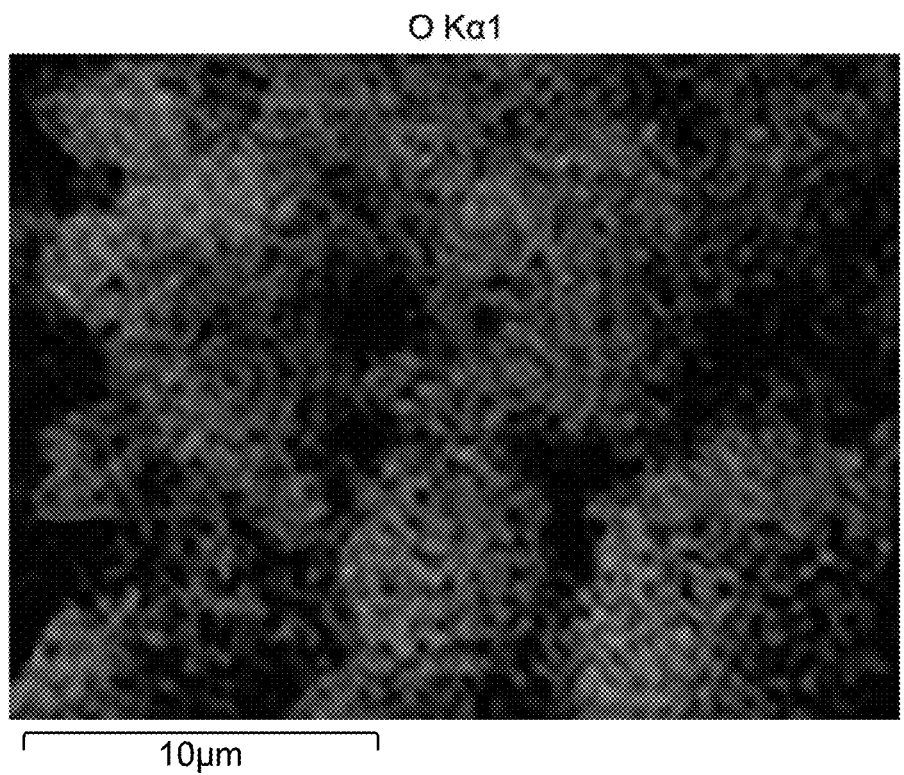
FIG. 6D shows an EDS-elemental mapping image of the precipitate showing the presence of oxygen (O), according to certain embodiments.
Figure 6E:
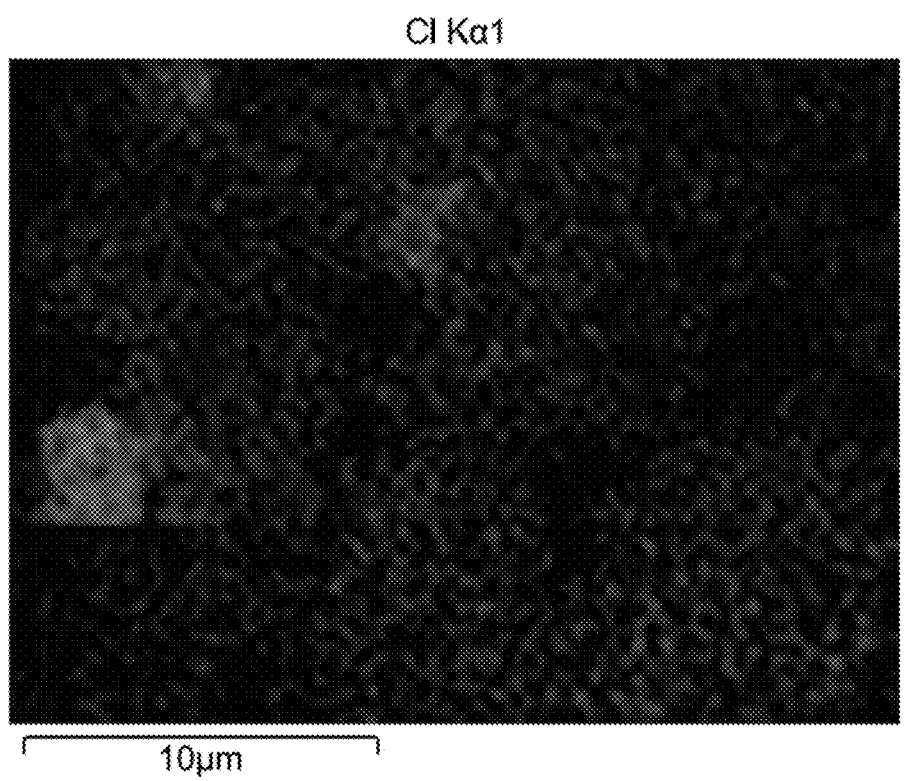
FIG. 6E shows an EDS-elemental mapping image of the precipitate showing the presence of chlorine (Cl), according to certain embodiments.
Figure 6F:
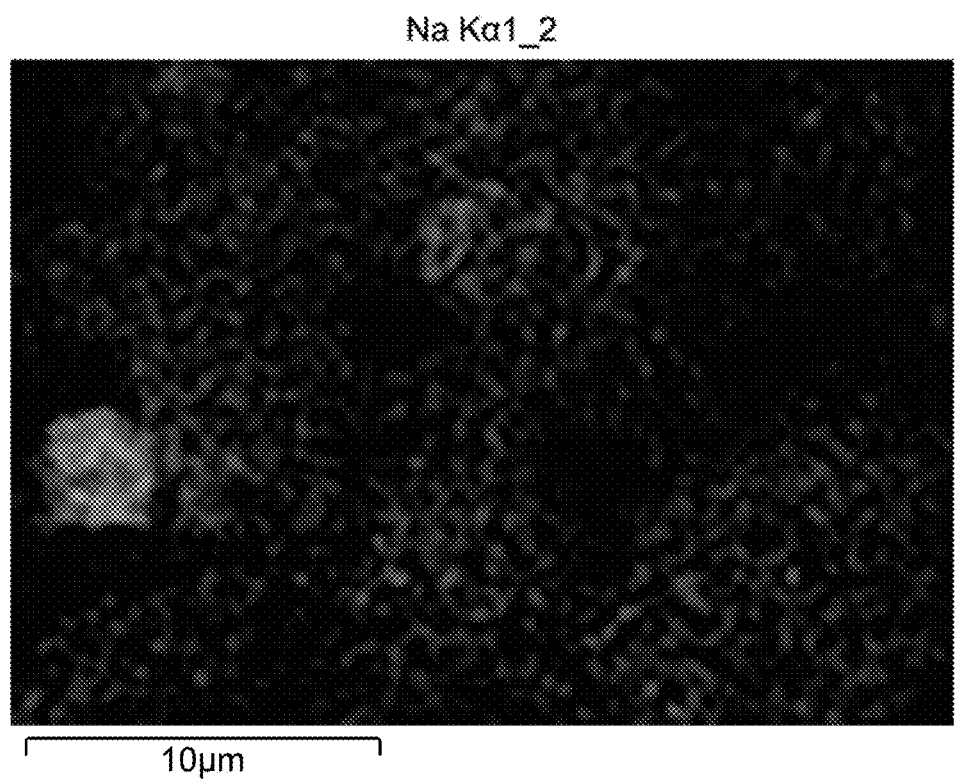
FIG. 6F shows an EDS-elemental mapping image of the precipitate showing the presence of sodium (Na), according to certain embodiments.
Figure 6G:
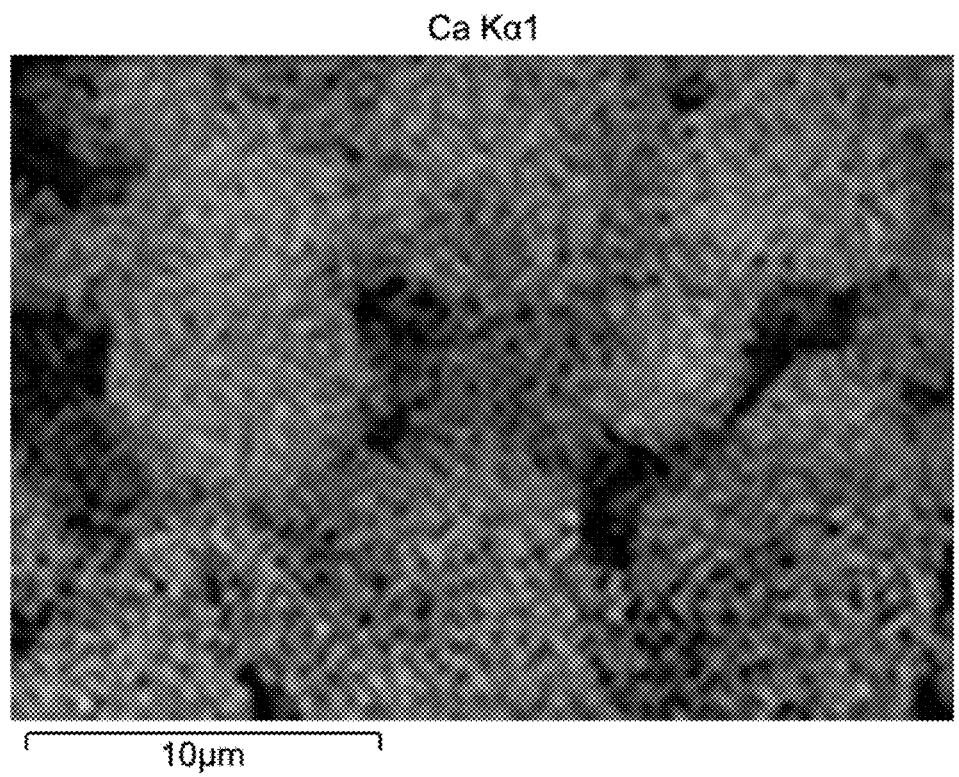
FIG. 6G shows an EDS-elemental mapping image of the precipitate showing the presence of calcium (Ca), according to certain embodiments.

Furthermore, the ICP and TIC results are supported by the XRD and SEM-EDS findings. As shown in FIG. 3, XRD revealed that calcite ($CaCO_3$) made up 50% of the precipitation components. Moreover, the XRD data revealed that brucite ($Mg(OH)_2$), a valuable mineral, makes up 26% of precipitation materials. Brucite is used in several industries such as flame retardant, water treatment, rubber industry, and medicine. FIG. 4B, FIG. 4C, and FIG. 4D respectively show SEM images of the precipitation at a magnification of 1, 10, and 50 µm. FIG. 5A shows an SEM micrograph for analyzing an EDS spectrum while FIG. 5B shows the corresponding EDS spectrum of precipitated materials for analyzing elemental composition. The EDS spectrum revealed that calcium and carbon are the most concentrated. FIG. 6A shows an EDS-elemental map of the precipitate. FIGS. 6B-6G show an EDS-elemental mapping images of the precipitate showing the presence of carbon (C), magnesium (Mg), oxygen (O), chlorine (Cl), sodium (Na), and calcium (Ca), respectively. Table 7 lists elemental composition of precipitated materials using EDS.

TABLE 7

Elemental composition of precipitated materials using EDS

| Element | Line Type | Apparent concentration | k Ratio | wt. % | wt. % Sigma | Standard label | Factory standard |
|---|---|---|---|---|---|---|---|
| C  | K series | 3.98  | 0.03979 | 23.87 | 1.85 | C Vit | Yes |
| O  | K series | 13.41 | 0.04513 | 45.69 | 1.68 | $SiO_2$ | Yes |
| Na | K series | 0.77  | 0.00325 | 1.29  | 0.34 | Albite | Yes |
| Mg | K series | 3.99  | 0.02647 | 6.96  | 0.45 | MgO | Yes |
| Cl | K series | 0.93  | 0.00812 | 1.17  | 0.20 | NaCl | Yes |
| Ca | K series | 17.95 | 0.16041 | 21.01 | 0.82 | Wollastonite | Yes |
| Total: | | | | 100.00 | | | |

TABLE 8

Mean zeta potential values of different waters

| Sample | Without Oil | With Oil |
|---|---|---|
| Produced water | -2.8 | -3.1 |
| Carbonated water | 8.0 | -10.8 |
| Smart water | 12.9 | -17.3 |

Figure 7:
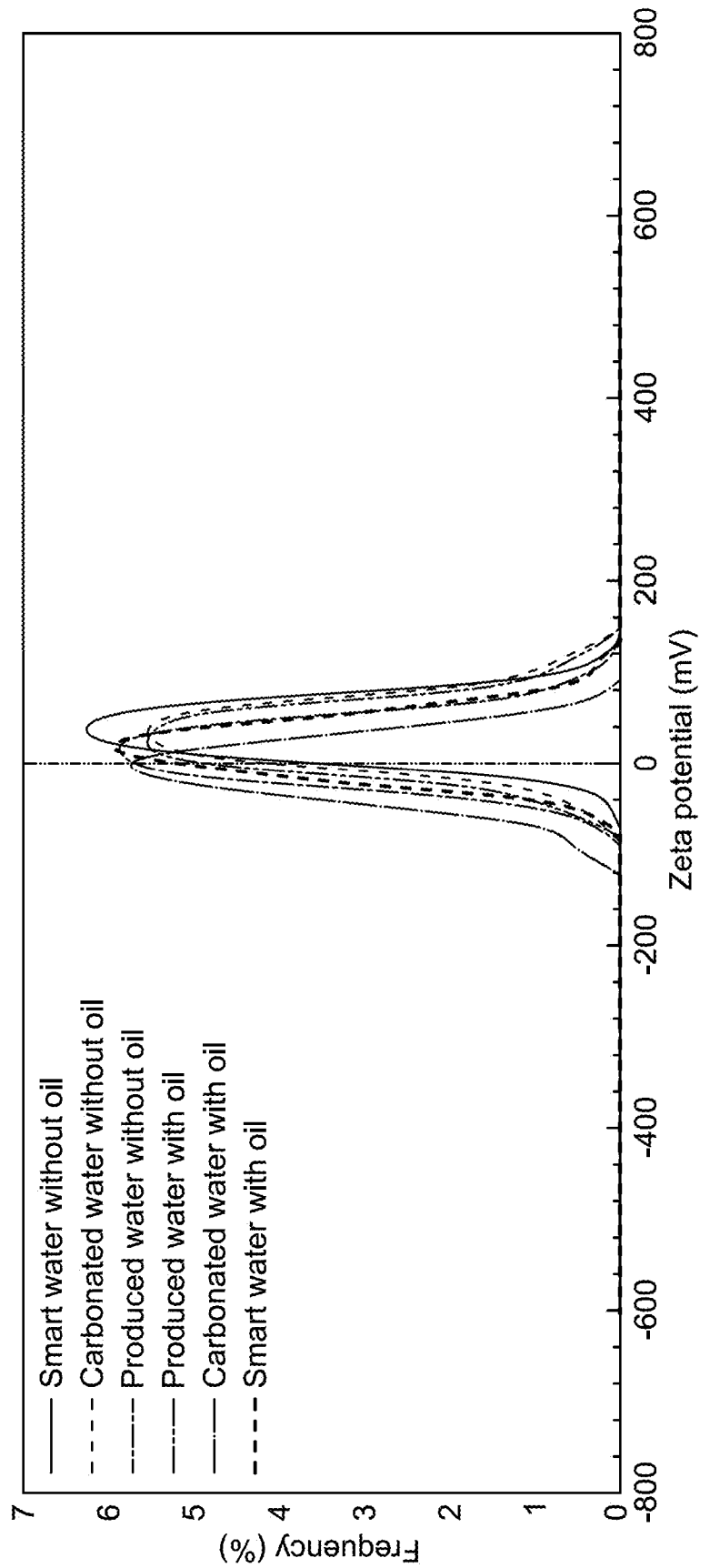
FIG. 7 shows mean zeta potential profiles of different waters with and without oil., according to certain embodiments.

Zeta potential ($\zeta$) measurements are valuable for understanding the electrostatic repulsions within formulations, providing insights into their charge characteristics. The value of zeta potential is influenced by various factors, including the nature of the solution, ionic strength, dispersion concentration, pH, density, and formulation method, such as ultrasonication. FIG. 7 illustrates the different zeta potential curves for various waters with and without oil. Table 8 presents the mean zeta potential values for both cases and all formulations.

In the absence of oil, the produced water exhibited a slightly negative charge ($\zeta=-2.8$ millivolts (mV)), likely due to the presence of various salts with differing effects on surface charge. The zeta potential tends to become less negative with increasing salinity, a trend observed in this case and consistent with previous studies [Hosseini, M., Awan, F. U. R., Jha, N. K., Keshavarz, A., & Iglauer, S. (2023). *Streaming and zeta potentials of basalt as a function of pressure, temperature, salinity, and pH. Fuel*, 351, 128996., Hou, J., Han, M., & Wang, J. (2021). *Manipulation of surface charges of oil droplets and carbonate rocks to improve oil recovery. Scientific Reports*, 11(1), 14518., and Mahani, H., Keya, A. L., Berg, S., & Nasralla, R. (2015, September). *The effect of salinity, rock type and pH on the electrokinetics of carbonate-brine interface and surface complexation modeling. In SPE Reservoir Characterisation and Simulation Conference and Exhibition?*(p. D031S020R001). SPE., all of which are incorporated herein by reference in their entirety]. The carbonated water has a positive charge ($\zeta=8.0$ mV) due to the generation of carbonic acid (low pH) and the release of protons ($H^+$ ions). These protons can protonate functional groups on the surface, leading to a positive surface charge and potentially a positive zeta potential.

positive mean ($\zeta=12.9$ mV) [Kosmulski, M, & Mqczka, E. (2022). *Zeta potential and particle size in dispersions of alumina in 50-50 w/w ethylene glycol-water mixture. Colloids and Surfaces A: Physicochemical and Engineering Aspects*, 654, 130168., Xiang, Q., Qin, J., Qin, T., Chen, L., & Zhang, D. (2022). *Kinetics study of anodic electrophoretic deposition for polytetrafluoroethylene (PTFE) coatings on AZ31 magnesium alloy*. BMC chemistry, 16(1), 92., both of which are incorporated herein by reference in their entirety]. Nonetheless, it should be noted that the exact effect of NaOH on zeta potential depends on the specific system and the concentrations of NaOH and other ions present.

Regarding the smart water, NaOH is a strong base that can raise the pH of a solution. When added to water, NaOH dissociates into hydroxide ions ($OH^-$) and sodium ions ($Na^+$). In certain conditions, particularly with sufficiently high pH, NaOH can deprotonate certain functional groups on surfaces to the point where the charge starts reversing, which was observed in previous studies till the surface becomes positively charged, as observed in this case with a For the produced water, the mean zeta potential became slightly more negative ($\zeta=-3.1$ mV) in the presence of oil. Similarly, both carbonated and smart waters exhibited positive mean zeta potential values in the absence of oil, but in the presence of oil, both ended up having largely negative mean zeta potential values ($\zeta_{Carbonated}=-10.8$ mV) and ($\zeta_{smart}=-17.3$ mV). The change from positive to negative potential at the oil/brine interface, especially at higher pH where the zeta potential decays to zero at the isoelectric point and then becomes strongly negative, leads to a change from attractive to repulsive electrostatic forces.

Crude oil often contains acidic components such as naphthenic acids, which can adsorb onto solid surfaces, introducing negative charges and reducing the zeta potential which has been noted in previous studies [Buckley, J. S., Takamura, K., & Morrow, N. R. (1989). *Influence of electrical surface charges on the wetting properties of crude oils. SPE reservoir engineering*, 4(03), 332-340., Chow, R. S., & Takamura, K. (1988). *Electrophoretic mobilities of bitumen and conventional crude-in-water emulsions using the laser Doppler apparatus in the presence of multivalent cations. Journal of colloid and interface science*, 125(1), 212-225., both of which are incorporated herein by reference in their entirety]. Additionally, resins and asphaltenes in crude oil can also adsorb onto surfaces and alter their charge characteristics, potentially leading to a negative zeta potential at certain pH.

Furthermore, the presence of $CO_2$, brine, and oil together can lead to a higher ionic strength compared to the system without $CO_2$. This higher ionic strength can compress the electrical double layer around particles or surfaces, leading to a more negative zeta potential. Regarding smart water, previously at sufficiently high pH, a positive mean zeta potential was obtained. However, upon the addition of oil and the subsequent reduction in pH due to acidic components, the overall pH of the system can affect the surface charge and zeta potential. This shift towards acidity, combined with the presence of oil, leads to a negative zeta potential with smart water, with the most negative value obtained due to the combined effects of oil and NaOH.

Figure 8:
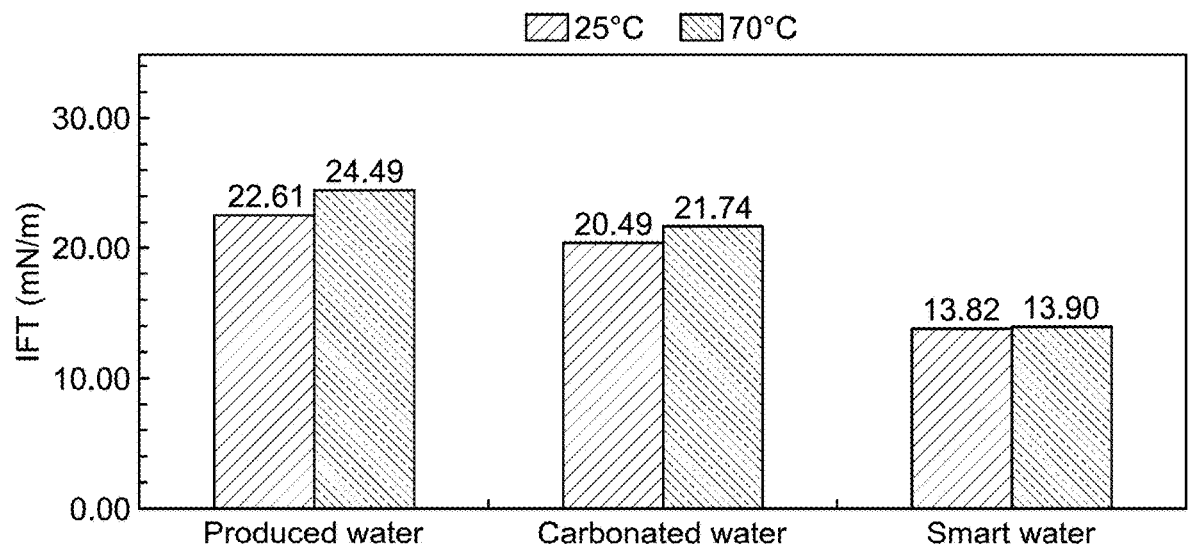
FIG. 8 shows interfacial tension (IFT) values of different water at 25 degrees Celsius (° C.) and 70° C., according to certain embodiments.

IFT measurements were conducted to assess the effect of liquid/liquid interactions of different formulations at temperatures of 25° C. and 70° C. (FIG. 8). At 25° C., the carbonated water showed no significant effect on IFT ($\sigma$=20.49 milli Newton per meter (mN/m)), with only a slight reduction observed. In contrast, the smart water, which contained NaOH, exhibited a significant reduction in IFT ($\sigma$=13.82 mN/m) compared to both produced and carbonated waters. This can be attributed to NaOH's alkaline nature, which can generate in-situ surfactants upon contact with acids in the crude oil, leading to lower IFT. Surfactants are known to reduce IFT, and thus, having some acidic compounds present in the crude oil, as indicated by the acid number, can facilitate surfactant generation.

The measurements at 70° C. showed a slight increase in IFT with produced and carbonated waters ($\sigma$=24.49 mN/m) and ($\sigma$=21.74 mN/m) respectively, which is consistent with previous studies indicating that IFT can increase with temperature in some systems. The influence of brine on IFT is complex and does not always show a clear trend in the literature. However, the smart water exhibited a very similar IFT value at both 25° C. and 70° C. While it is not conclusive that there is a certain trend, it is evident that the addition of alkaline NaOH leads to a much better reduction in IFT in both temperatures.

Figure 9:
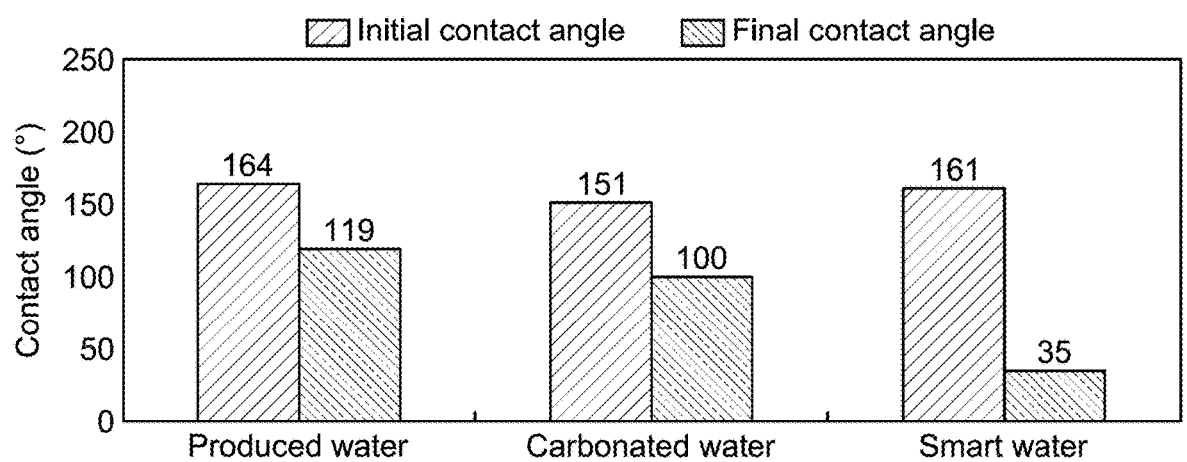
FIG. 9 shows contact angles of different waters with Berea sandstone discs, according to certain embodiments.

Contact angle measurements were conducted for all formulations to assess wetting behavior and liquid/solid interactions. It is important to note that the findings from salt precipitation and zeta potential measurements are important for this analysis, as they provide the mechanism and expectations for the results. FIG. 9 shows contact angle of different waters with Berea sandstone discs. It illustrates the initial and final water contact angle values for different waters with Berea sandstone.

The smart water transformed the rock from strongly oil-wet (161°) to strongly water-wet (35°), primarily due to its zeta potential shift from a positive to a negative mean value. This shift aligns with observations in previous studies with various crude oils. It should be mentioned that sandstone, primarily composed of quartz, is commonly associated with a negative surface charge. The change in zeta potential observed previously from positive to negative at the oil/brine interface alters electrostatic forces from attractive to repulsive with the sandstone, leading to a shift in wetting tendency from oil to water-wet.

Additionally, competitive adsorption of NaOH ions can alter surface properties by competing with cations present in clay minerals, affecting wettability. The isoelectric point (IEP), which is the pH at which the charge is neutral, of common clay minerals in sandstone, such as kaolinite, illite, and montmorillonite, generally falls within a pH range of 3 to 6, influencing surface charge and wettability. Surface charge and wettability are closely related, with clay surfaces carrying a net positive charge below the IEP, leading to more oil-wet conditions and a negative charge above the IEP, potentially resulting in more water-wet conditions. Adjusting pH above the IEP can change the clay surface charge to negative, promoting water-wetness.

Another reason for the enhanced wettability alteration is the lower salinity resulting from the addition of NaOH. As demonstrated earlier, the addition of NaOH induces the precipitation of certain salts, reducing the total dissolved salts in the solution. Lower water salinity is often associated with improved wettability alteration towards a more water-wet state. Produced water and carbonated water were less effective in altering clay charges due to inadequate pH modification compared to smart water. Additionally, both solutions exhibited relatively lower mean zeta potentials, which explains their reduced ability to alter wettability compared to smart water.

Figure 10:
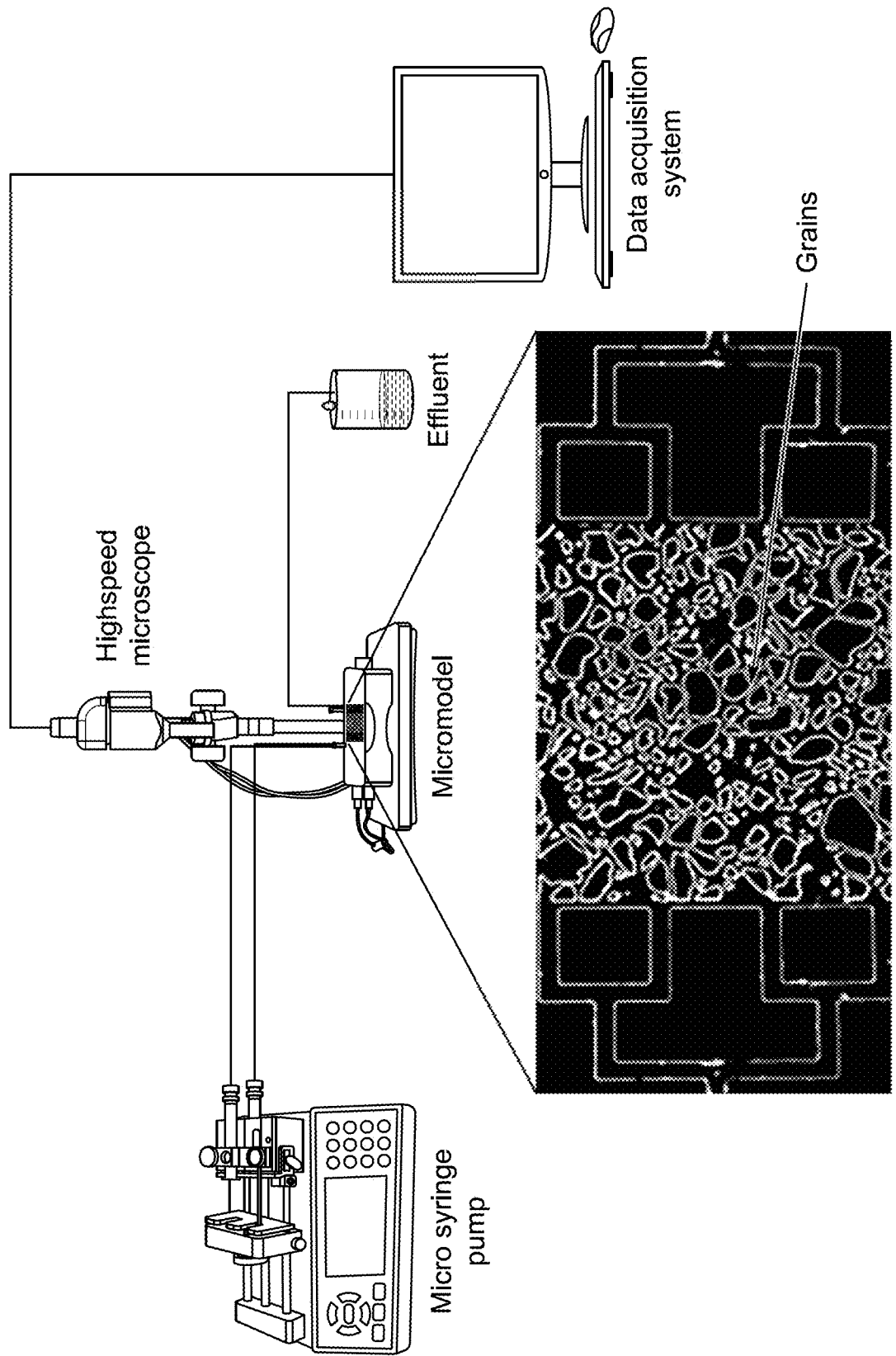
FIG. 10 shows a schematic diagram of the micromodel setup utilized, according to certain embodiments.

After assessing the effectiveness of smart water in reducing IFT and significantly altering rock wettability, the findings needed to be confirmed through the utilization of flooding techniques to assess oil recovery enhancements using different waters discussed in this study. As illustrated previously, a glass micromodel will be used with the properties mentioned in Table 4. FIG. 10 shows a schematic diagram of the utilized setup, which was mentioned in detail in the methodology section. As depicted in FIG. 10, the chip is first saturated with formation water at a flow rate of 1 µL/h and then left overnight to ensure saturation without air bubbles. Subsequently, oil is injected at the same rate and left overnight to achieve oil saturation, with the remaining water saturation indicating irreducible water saturation. Following this, the desired fluid is injected at a rate of 4 µL/h, and the recovery process is analyzed using the image processing software ImageJ.

Figure 11:
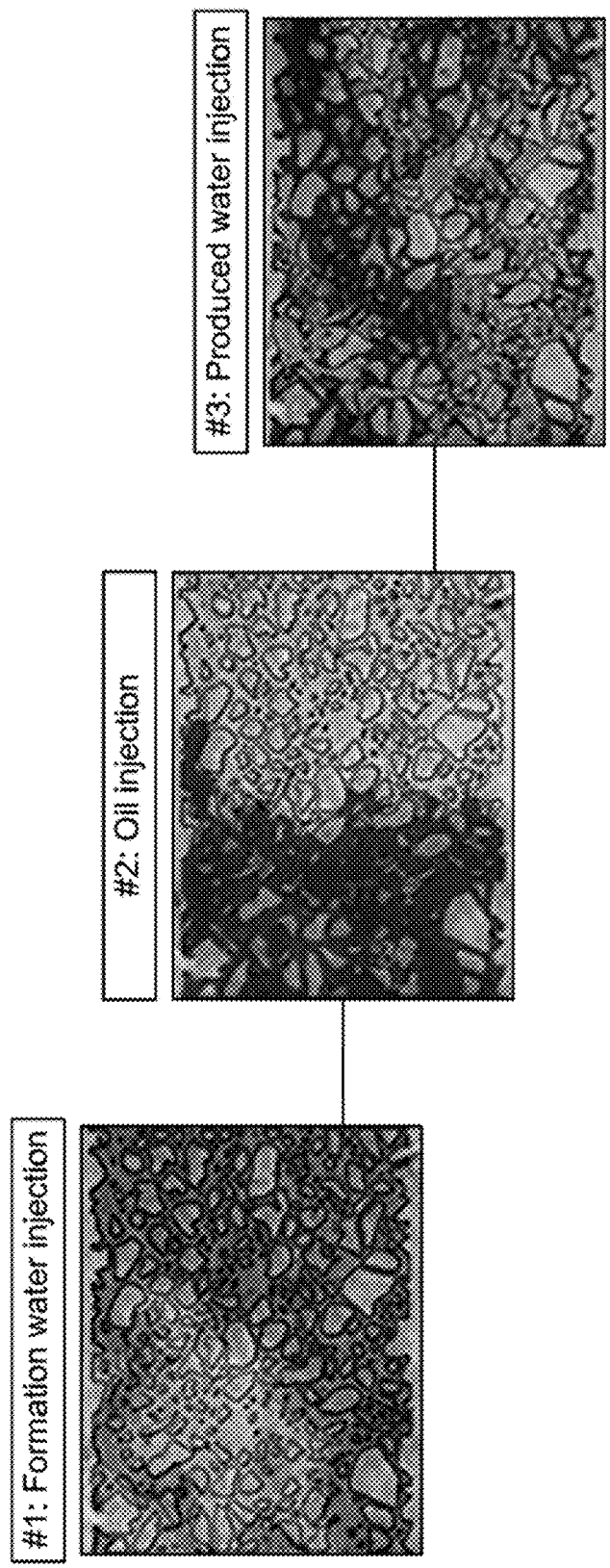
FIG. 11 shows a schematic diagram of the procedure followed for each water injection utilizing the micromodel, according to certain embodiments.

The procedure was consistent for all the water samples in this study. Images were captured during each water injection and processed using ImageJ. The contrast between oil and water was utilized to calculate the initial volume of oil and its volume during various stages of the flood. This calculation involved setting a specific threshold to distinguish between water and oil, which remained consistent across all three experiments. FIG. 11 shows a schematic diagram of the procedure followed for each water injection utilizing the micromodel.

Figure 12:
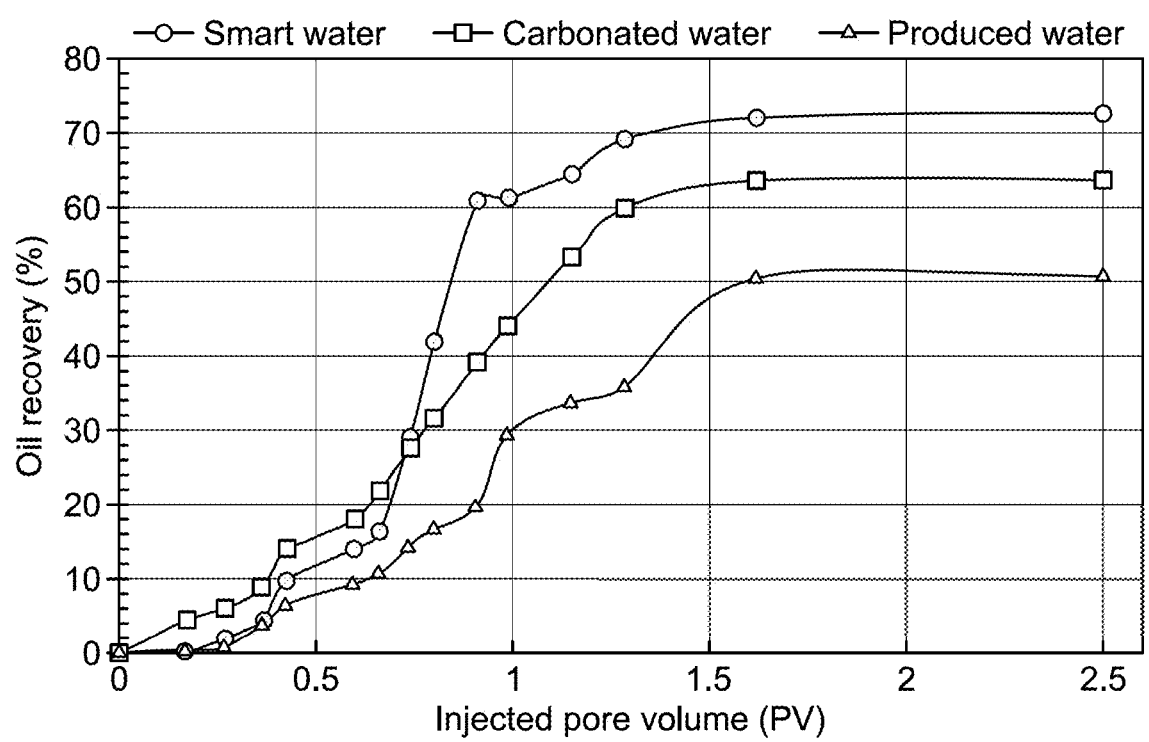
FIG. 12 is a plot showing recovery performance of each water with the same injected pore volume, according to certain embodiments.
Figure 13:
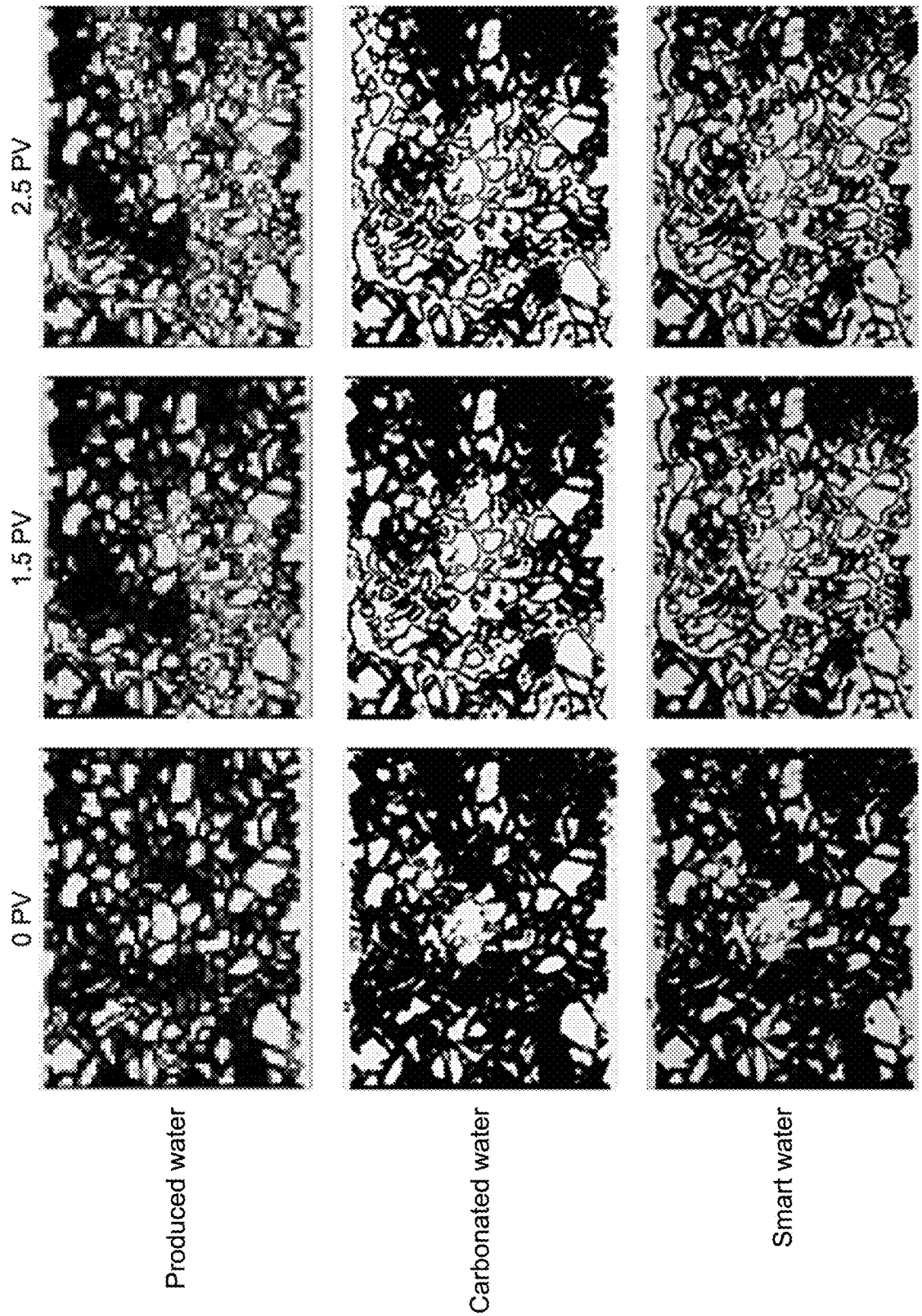
FIG. 13 shows segmented images of each water injection with different pore volumes, according to certain embodiments.

FIG. 12 is a plot showing recovery performance of each water with the same injected pore volume. FIG. 13 shows segmented images of each water injection with different pore volumes. It clearly shows that the smart water led to the highest oil recovery. This can be attributed to the enhanced micro-displacement efficiency, which resulted in more effective oil recovery. The improvement in micro-displacement efficiency is at least partially due to the reduction in capillary forces, which typically hinder oil recovery or make oil recovery challenging. As previously demonstrated, the smart water exhibited a much lower IFT compared to both the produced and carbonated waters. Furthermore, it was the only water that altered the wettability of Berea sandstone from strongly oil-wet to strongly water-wet. Therefore, a combination of these factors resulted in an oil recovery of 72.68% for smart water, 63.77% for carbonated water, and 50.71% for produced water.

It is important to note that the carbonated water yielded a higher recovery compared to the produced water due to its superior wettability alteration and IFT reduction. Although the differences were not significant, they contributed to an overall better oil recovery. However, the smart water demonstrated the highest performance in oil recovery, making it a sustainable and cost-effective solution. The smart water utilizes the produced water from oil reservoirs, eliminating the need for seawater, which can be expensive and inaccessible in some reservoirs.

Aspects of the present disclosure are directed towards the potential of using $CO_2$ in the mineralization process for treating produced water for enhanced oil recovery (EOR), while also producing valuable minerals as a byproduct, making the proposed approach more effective. In addition, the XRD results showed that brucite which is a valuable mineral, was 26% of precipitation materials. Brucite finds use in various industries including flame retardant, water treatment, rubber manufacturing, and medicine.

Smart water (or processed water), with its higher pH due to NaOH, exhibited significant changes in zeta potential, shifting from positive to negative in the presence of oil. This shift, along with wettability alteration and reduced interfacial tension observed with smart water, contributed to its superior performance in enhancing oil recovery compared to produced and carbonated waters. The smart water (or the processed water) also demonstrated the highest oil recovery efficiency, with an average recovery of 72.68%, compared to 63.77% for the carbonated water and 50.71% for the produced water. The use of $CO_2$ to improve the quality of the produced water from hydrocarbon reservoirs through $CO_2$ mineralization can be a successful method for lowering the carbon footprint through better oil recovery operations and the generation of brucite mineral. The findings also suggest that the smart water can be a key player in the future of EOR.

Numerous modifications and variations of the present disclosure are possible in light of the above teachings. It is therefore to be understood that within the scope of the appended claims, the invention may be practiced otherwise than as specifically described herein.

The invention claimed is:

1. A method of co-generating hydrocarbon and mineral products by recycling an aqueous byproduct, the method comprising:
   (a) obtaining produced water from a subterranean reservoir via a production well that is in fluid communication with a first side of the subterranean reservoir;
   (b) treating the produced water with carbon dioxide to obtain carbonated water including 30-50 g/L of carbon dioxide;
   (c) treating the carbonated water with a base including hydroxide ions to obtain processed water and a precipitate therein, wherein the precipitate includes mineral salts, and the processed water includes a portion of the hydroxide ions and has a pH of at least 10 so that the processed water does not include carbonate ions or hydrogencarbonate ions;
   (d) injecting the processed water into the subterranean reservoir via an injection well that is in fluid communication with a second side of the subterranean reservoir, the processed water displacing fluids naturally present in the subterranean reservoir, the fluids including crude oil and formation water;
   (e) collecting the fluids via the production well;
   (f) separating the crude oil from the formation water; and
   (g) repeating (b), (c), (d), (e) and (f) using the formation water as the produced water.

2. The method of claim 1, further comprising:
   between (c) and (d), filtering the processed water to separately collect the precipitate and the processed water.

3. The method of claim 2, wherein:
   the precipitate includes calcium carbonate ($CaCO_3$), magnesium carbonate ($MgCO_3$) and magnesium hydroxide ($Mg(OH)_2$).

4. The method of claim 1, further comprising:
   between (a) and (b), filtering the carbonated water to remove a suspended solid.

5. The method of claim 1, further comprising:
   between (f) and (g), desalting the crude oil by adding water to form a mixture, heating the mixture, removing salty water from the mixture, and adding the salty water to the formation water.

6. The method of claim 1, wherein:
   in (f), the separating the crude oil from the formation water includes at least one selected from the group consisting of decantation, centrifugation, gas flotation, filtration and capacitance-based separation.

7. The method of claim 1, wherein:
   the processed water leads to a volumetric oil recovery increase of about 40% relative to the produced water and about 14% relative to the carbonated water.

8. The method of claim 1, wherein:
   a surface tension between the processed water and the crude oil is at least 30% smaller than a surface tension between the carbonated water and the crude oil, and
   the processed water reduces a water contact angle of rocks in the subterranean reservoir from 150-170 degrees (°) to 25-45°.

9. The method of claim 1, wherein:
   the method includes a closed aqueous loop in which no water other than the fluids naturally present in the subterranean reservoir is used.

10. The method of claim 1, wherein:
    the processed water is injected into the subterranean reservoir so that the portion of the hydroxide ions in the processed water reacts with an organic acid naturally present in the subterranean reservoir to form a surfactant.

11. The method of claim 1, wherein:
    in (b), the treating the produced water with carbon dioxide includes introducing the carbon dioxide at a pressure of 600-1,000 pounds per square inch (psi).

12. The method of claim 1, wherein:
    in (d), the processed water is injected into the subterranean reservoir at a temperature of 20-30 degrees Celsius (° C.).

13. The method of claim 1, wherein the produced water includes, based on a total weight of the produced water:
    10,000-60,000 parts per million (ppm) of $Na^+$;
    800-5,000 ppm of $Mg^{2+}$; and
    3,000-8,000 ppm of $Ca^{2+}$.

14. The method of claim 13, wherein the processed water includes, based on a total weight of the processed water:
    10,000-60,000 ppm of $Na^+$;
    200-600 ppm of $Mg^{2+}$; and
    2,000-3,000 ppm of $Ca^{2+}$.

15. The method of claim 1, wherein:
    the produced water includes, based on a total weight of the produced water,
        about 18,991 parts per million (ppm) of $Na^+$,
        about 1,016 ppm of $Mg^{2+}$, and
        about 3,822 ppm of $Ca^{2+}$,
    the processed water includes, based on a total weight of the processed water, about 20,314 ppm of $Na^+$,
about 403 ppm of $Mg^{2+}$, and
about 2,831 ppm of $Ca^{2+}$, and
the carbonated water includes about 41.41 g/L of carbon dioxide.

16. The method of claim 1, wherein:
the produced water has a pH of 5 to 7,
the carbonated water has a pH of 3 to 6, and
the processed water has a pH of 10 to 14.

17. The method of claim 1, wherein:
the produced water has a pH of about 6.84,
the carbonated water has a pH of about 5.28, and
the processed water has a pH of about 10.15.

18. The method of claim 1, wherein:
the base includes at least one strong base selected from the group consisting of sodium hydroxide, potassium hydroxide and lithium hydroxide.

19. The method of claim 1, wherein the crude oil includes, based on a total weight of the crude oil:
20-30 wt. % of saturated alkanes;
40-60 wt. % of aromatics;
20-30 wt. % of resins; and
1-10 wt. % of asphaltenes.

20. The method of claim 1, wherein the crude oil includes, based on a total weight of the crude oil:
about 22.76 wt. % of saturated alkanes;
about 50.04 wt. % of aromatics;
about 24.16 wt. % of resins; and
about 3.04 wt. % of asphaltenes.

* * * * *